US009301016B2

(12) United States Patent
Archibong et al.

(10) Patent No.: US 9,301,016 B2
(45) Date of Patent: Mar. 29, 2016

(54) SHARING TELEVISION AND VIDEO PROGRAMMING THROUGH SOCIAL NETWORKING

(75) Inventors: Ime Archibong, San Francisco, CA (US); Gregory Joseph Badros, Palo Alto, CA (US); Cameron Alexander Marlow, Menlo Park, CA (US); Mark Heynen, San Francisco, CA (US); Justin Alexander Shaffer, Menlo Park, CA (US); Christopher Cox, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/440,306

(22) Filed: Apr. 5, 2012

(65) Prior Publication Data

US 2013/0268973 A1 Oct. 10, 2013

(51) Int. Cl.
| | |
|---|---|
| *H04N 21/4782* | (2011.01) |
| *G06Q 50/00* | (2012.01) |
| *H04N 21/4788* | (2011.01) |
| *H04N 21/482* | (2011.01) |
| *H04N 21/488* | (2011.01) |
| *H04N 21/63* | (2011.01) |
| *H04N 21/472* | (2011.01) |
| *H04N 21/475* | (2011.01) |
| *H04N 21/84* | (2011.01) |

(52) U.S. Cl.
CPC ........... *H04N 21/4782* (2013.01); *G06Q 50/01* (2013.01); *H04N 21/4788* (2013.01); *H04N 21/488* (2013.01); *H04N 21/4828* (2013.01); *H04N 21/632* (2013.01); *H04N 21/4756* (2013.01); *H04N 21/47214* (2013.01); *H04N 21/84* (2013.01)

(58) Field of Classification Search
CPC .... H04N 21/258; H04N 21/442; H04N 21/45
USPC .................................. 725/40, 43–53, 58, 61
See application file for complete search history.

(56) References Cited

U.S. PATENT DOCUMENTS

| | | |
|---|---|---|
| 5,694,163 A | 12/1997 | Harrison |
| 5,798,785 A | 8/1998 | Hendricks |

(Continued)

OTHER PUBLICATIONS

PCT Notification of Transmittal of the International Search Report and the Written Opinion of the International Searching Authority, or the Declaration, PCT/US2013/035051 14 pages, Date of Mailing Jul. 9, 2013.

(Continued)

*Primary Examiner* — Jason Salce
(74) *Attorney, Agent, or Firm* — Baker Botts, L.L.P.

(57) ABSTRACT

In particular embodiments a social networking system may receive from an external system outside the social-networking system, a request comprising a user identifier associated with a user of the social-networking system, query a social graph for stories generated by one or more connections of the user on the social-networking system, and transmit the stories to the external system. Similarly the social networking system may receive, from an external system outside of the social networking system, a request comprising a user identifier associated with a user of the social networking system, a content identifier, and a action performed by the user on the content identifier, generate a story for the received request, and publish the story to one or more connections of the user on the social networking system.

18 Claims, 14 Drawing Sheets

(56) References Cited

U.S. PATENT DOCUMENTS

| | | | |
|---|---|---|---|
| 6,081,830 A | 6/2000 | Schindler | |
| 6,738,809 B1 | 5/2004 | Brisebois et al. | |
| 7,370,343 B1 | 5/2008 | Ellis | |
| 7,624,416 B1 | 11/2009 | Vandermolen et al. | |
| 8,095,432 B1 | 1/2012 | Berman et al. | |
| 8,756,276 B2 * | 6/2014 | Tseng et al. | 709/203 |
| 8,769,422 B2 | 7/2014 | Russell et al. | |
| 2002/0188959 A1 | 12/2002 | Piotrowski | |
| 2003/0078972 A1 | 4/2003 | Tapissier et al. | |
| 2003/0159153 A1 | 8/2003 | Falvo et al. | |
| 2003/0182663 A1 | 9/2003 | Gudorf et al. | |
| 2003/0189669 A1 | 10/2003 | Bowser | |
| 2003/0226144 A1 | 12/2003 | Thurston et al. | |
| 2004/0031058 A1 | 2/2004 | Reisman | |
| 2004/0109063 A1 | 6/2004 | Kusaka et al. | |
| 2004/0153456 A1 | 8/2004 | Charnock et al. | |
| 2004/0250285 A1 | 12/2004 | Murphy et al. | |
| 2005/0071865 A1 | 3/2005 | Martins | |
| 2005/0086682 A1 | 4/2005 | Burges et al. | |
| 2005/0138674 A1 | 6/2005 | Howard et al. | |
| 2005/0256756 A1 | 11/2005 | Lam et al. | |
| 2005/0262542 A1 | 11/2005 | DeWeese et al. | |
| 2006/0031889 A1 | 2/2006 | Bennett et al. | |
| 2006/0064734 A1 | 3/2006 | Ma | |
| 2006/0139373 A1 | 6/2006 | Sloo et al. | |
| 2006/0184967 A1 | 8/2006 | Maynard et al. | |
| 2006/0212911 A1 | 9/2006 | MacMullan et al. | |
| 2006/0230061 A1 | 10/2006 | Sample et al. | |
| 2006/0271630 A1 | 11/2006 | Bensky et al. | |
| 2006/0271959 A1 | 11/2006 | Jacoby et al. | |
| 2007/0124756 A1 | 5/2007 | Covell et al. | |
| 2007/0186241 A1 | 8/2007 | Sugimoto et al. | |
| 2007/0250901 A1 | 10/2007 | McIntire et al. | |
| 2007/0256126 A1 | 11/2007 | Erickson et al. | |
| 2007/0283403 A1 | 12/2007 | Eklund et al. | |
| 2008/0082510 A1 | 4/2008 | Wang et al. | |
| 2008/0083003 A1 | 4/2008 | Biniak et al. | |
| 2008/0109843 A1 | 5/2008 | Ullah | |
| 2008/0109888 A1 | 5/2008 | Ullah | |
| 2008/0178242 A1 * | 7/2008 | Eyal et al. | 725/115 |
| 2008/0222199 A1 | 9/2008 | Tiu et al. | |
| 2008/0235742 A1 | 9/2008 | Osaki et al. | |
| 2008/0244676 A1 | 10/2008 | DaCosta | |
| 2008/0271078 A1 | 10/2008 | Gossweiler et al. | |
| 2009/0083815 A1 | 3/2009 | McMaster et al. | |
| 2009/0100469 A1 | 4/2009 | Conradt et al. | |
| 2009/0138805 A1 | 5/2009 | Hildreth | |
| 2009/0150928 A1 | 6/2009 | Hsu et al. | |
| 2009/0154899 A1 | 6/2009 | Barrett et al. | |
| 2009/0172745 A1 | 7/2009 | Horozov et al. | |
| 2009/0178081 A1 | 7/2009 | Goldenberg et al. | |
| 2009/0228918 A1 | 9/2009 | Rolff et al. | |
| 2009/0228919 A1 | 9/2009 | Zott et al. | |
| 2009/0292376 A1 | 11/2009 | Kazem et al. | |
| 2009/0293079 A1 * | 11/2009 | McKee et al. | 725/10 |
| 2010/0037277 A1 | 2/2010 | Flynn-Ripley et al. | |
| 2010/0076851 A1 | 3/2010 | Jewell, Jr. | |
| 2010/0083362 A1 | 4/2010 | Francisco | |
| 2010/0095343 A1 * | 4/2010 | Kaihotsu | 725/118 |
| 2010/0131385 A1 | 5/2010 | Harrang et al. | |
| 2010/0146376 A1 | 6/2010 | Reams | |
| 2010/0169786 A1 | 7/2010 | O'Brien et al. | |
| 2010/0185507 A1 | 7/2010 | Tokuda | |
| 2010/0199308 A1 | 8/2010 | Hall et al. | |
| 2010/0218211 A1 | 8/2010 | Herigstad et al. | |
| 2010/0241699 A1 | 9/2010 | Muthukumarasamy et al. | |
| 2010/0251305 A1 | 9/2010 | Kimble et al. | |
| 2010/0262992 A1 | 10/2010 | Casagrande | |
| 2010/0275233 A1 * | 10/2010 | Soohoo et al. | 725/46 |
| 2010/0319034 A1 * | 12/2010 | Mountain | 725/68 |
| 2010/0319043 A1 | 12/2010 | Jain et al. | |
| 2011/0004692 A1 | 1/2011 | Occhino et al. | |
| 2011/0040760 A1 | 2/2011 | Fleischman et al. | |
| 2011/0055309 A1 | 3/2011 | Gibor et al. | |
| 2011/0078724 A1 * | 3/2011 | Mehta et al. | 725/32 |
| 2011/0107379 A1 | 5/2011 | Lajoie et al. | |
| 2011/0126251 A1 * | 5/2011 | LaFreniere et al. | 725/110 |
| 2011/0126257 A1 | 5/2011 | Goergen et al. | |
| 2011/0126258 A1 | 5/2011 | Emerson et al. | |
| 2011/0138480 A1 | 6/2011 | Janoulis et al. | |
| 2011/0173668 A1 | 7/2011 | Rooks et al. | |
| 2011/0197224 A1 | 8/2011 | Meijer | |
| 2011/0238754 A1 | 9/2011 | Dasilva et al. | |
| 2011/0251896 A1 | 10/2011 | Impollonia et al. | |
| 2011/0320380 A1 | 12/2011 | Zahn et al. | |
| 2012/0023534 A1 * | 1/2012 | Dasilva et al. | 725/109 |
| 2012/0036524 A1 * | 2/2012 | Mugulavalli et al. | 725/9 |
| 2012/0042334 A1 | 2/2012 | Choi et al. | |
| 2012/0047529 A1 | 2/2012 | Schultz et al. | |
| 2012/0075168 A1 | 3/2012 | Osterhout et al. | |
| 2012/0159327 A1 | 6/2012 | Law et al. | |
| 2012/0159337 A1 | 6/2012 | Travilla et al. | |
| 2012/0159527 A1 * | 6/2012 | Perez et al. | 725/10 |
| 2012/0174157 A1 * | 7/2012 | Stinson et al. | 725/40 |
| 2012/0174169 A1 * | 7/2012 | Nandiraju | 725/93 |
| 2012/0189284 A1 | 7/2012 | Morrison et al. | |
| 2012/0198488 A1 | 8/2012 | Son et al. | |
| 2012/0210247 A1 | 8/2012 | Khouri | |
| 2012/0240142 A1 * | 9/2012 | Rose | 725/14 |
| 2012/0259707 A1 | 10/2012 | Thielke et al. | |
| 2012/0278179 A1 | 11/2012 | Campbell et al. | |
| 2012/0331496 A1 * | 12/2012 | Copertino et al. | 725/14 |
| 2013/0014136 A1 | 1/2013 | Bhatia et al. | |
| 2013/0044959 A1 | 2/2013 | Mitchell et al. | |
| 2013/0061258 A1 | 3/2013 | Takaya et al. | |
| 2013/0191869 A1 | 7/2013 | Sugiyama et al. | |
| 2013/0198642 A1 | 8/2013 | Carney et al. | |
| 2013/0262585 A1 | 10/2013 | Niemeyer et al. | |
| 2014/0058812 A1 | 2/2014 | Bender et al. | |
| 2014/0068466 A1 | 3/2014 | Garcia et al. | |
| 2014/0140679 A1 | 5/2014 | Khader et al. | |
| 2014/0282674 A1 | 9/2014 | Conradt et al. | |
| 2014/0327677 A1 | 11/2014 | Walker | |

OTHER PUBLICATIONS

U.S. Appl. No. 13/602,011, filed Aug. 31, 2012, Marlow.
U.S. Appl. No. 13/688,736, filed Nov. 29, 2012, Archibong.
U.S. Appl. No. 13/691,035, filed Nov. 30, 2012, Archibong.
U.S. Appl. No. 13/688,850, filed Nov. 29, 2012, Bruich.
U.S. Appl. No. 13/689,285, filed Nov. 29, 2012, Garcia.
U.S. Appl. No. 13/689,355, filed Nov. 29, 2012, Bades.
U.S. Appl. No. 13/688,905, filed Nov. 29, 2012, Archibong.
U.S. Appl. No. 13/690,769, filed Nov. 30, 2012, Archibong.
U.S. Appl. No. 13/690,892, filed Nov. 30, 2012, Archibong.
U.S. Appl. No. 13/691,122, filed Nov. 30, 2012, Heynen.
U.S. Appl. No. 13/692,122, filed Dec. 3, 2012, Brennan.
U.S. Appl. No. 13/691,269, filed Nov. 30, 2012, Garcia.
U.S. Appl. No. 13/692,675, filed Dec. 3, 2012, Archibong.
U.S. Appl. No. 13/692,598, filed Dec. 3, 2012, Badros.
U.S. Appl. No. 13/692,006, filed Dec. 3, 2012, Brennan.
Notification of Transmittal of the International Search Report and the Written Opinion of the International Searching Authority, or the Declaration; International Application No. PCT/US2013/057449; International filing date: Aug. 30, 2013, date of mailing Dec. 11, 2013.
Martin, R. et al. "neXtream: A Multi-Device, Social Approach to Video Content Consumption." Consumer Communications and Networking Conference (CCNC), 2010 7th IEEE, 2010. 1-5, 2010.

* cited by examiner

SHARING TELEVISION AND VIDEO PROGRAMMING THROUGH SOCIAL NETWORKING

TECHNICAL FIELD

This disclosure relates generally to social networking.

BACKGROUND

Computer users may access and share information through various local and wide area computer networks, including proprietary networks as well as public networks such as the Internet. Typically, a web browser installed on a user's computing device facilitates access to and interaction with information located at various network servers identified by, for example, associated uniform resource locators (URLs). Social-networking websites may facilitate the sharing of user-generated content. Such websites may include, be linked with, or provide platforms for applications enabling users to view or interact with "profile" pages created or customized by other users. A set of rules may govern users' ability to view or interact with other users' profile pages, and a user's profile page may include user-declared information such as contact information, background information, job or career information, and interests.

A social network may be a social structure made of individuals, groups, entities, or organizations represented by nodes that are tied (connected) to each other by one or more specific types of interdependency. Social-network (graph) analysis may view social relationships, in terms of network theory, as nodes and edges. Nodes may represent the individual actors within the social network, and edges may represent the relationships between individual actors. The resulting graph-based structure(s) may very complex. There may be many kinds of edges between nodes. A social network (or social graph) may be a map of all relevant edges between or among all nodes being studied.

DESCRIPTION OF EXAMPLE EMBODIMENTS

Particular embodiments integrate third-party content delivery services such as cable providers and online video services with a social networking system for active and passive sharing of consumed content among the users of the social networking system. Such integration may permit a user of the social-networking system to discover content watched, "liked", or scheduled to be watched by the user's friends and first-degree connections. Similarly, the user may explicitly share content to his or her friends and first-degree connections by actively selecting user interface elements to "like" or "share" a piece of content, or passively share currently viewed content substantially in real-time by enabling a "sharing" mode.

In particular embodiments, users may discover or share content from any device or service integrated with the social networking system. For example, a particular user may discover content not only by browsing his or her friends' profile pages stored on and rendered by the social networking system, but by accessing a third-party web page of a over the top (OTT) content provider such as NetFlix or Hulu. In particular embodiments, a user may discover or share content via his or her television set through a multiple system operator (MSO) or other cable provider. In particular embodiments, social data may be presented to the user through the electronic program guide received from the MSO by the user's set-top box (STB), and displayed on the user's television set. In particular embodiments, users of the social networking system may discover or share content via a specialized application for a third-party service on a mobile computing device, such as a smartphone or tablet. For example, the user may browse his or her friends' favorite movies or share his or her own favorite movies via a NetFlix application resident on the user's smartphone. As another example, a user may discover or share content via a smartphone application that is also linked to a MSO or cable provider, such as a mobile application for managing the user's digital video recorder (DVR) offered by AT&T U-Verse cable service.

Particular embodiments may map multiple content descriptors from a plurality of services of varying formats into a single content identifier. For example, four users may share that they are watching the show "The Office" from Hulu, NetFlix, Comcast cable, and Dish Network satellite TV. Each individual service providers' format for identifying content may be of a different format and include varying text or meta-data. Absent centralized aggregation of these heterogeneous content descriptors into a single content identifier, shares from users of disparate services are meaningless and unusable. Hence, particular embodiments provide a system for matching content identifiers of varying format to a single node within the social graph.

Figure 1:
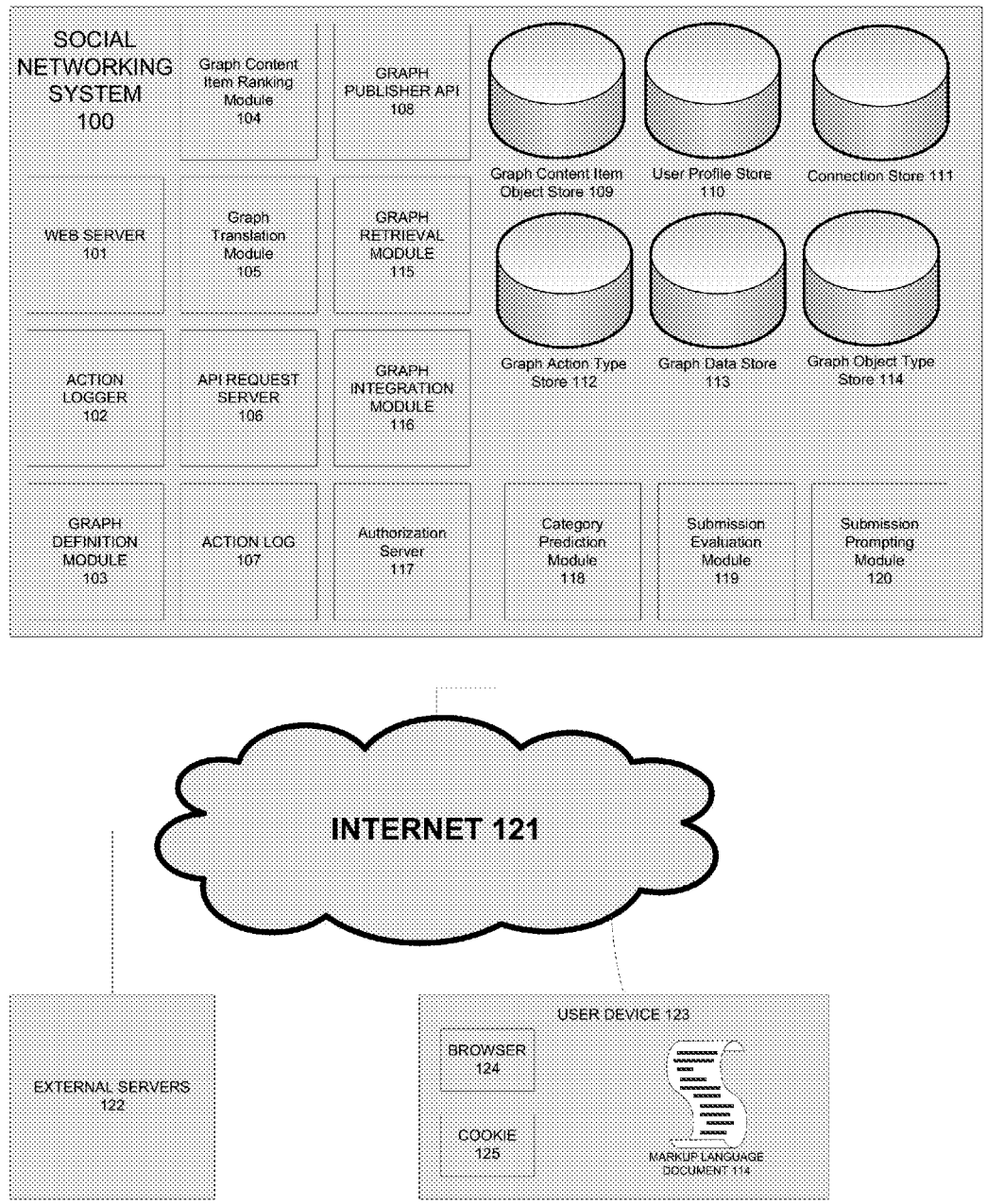
FIG. 1 illustrates an example social-networking system.

FIG. 1 is a network diagram of one embodiment of a social networking system 100. The network environment includes one or more user devices 123, one or more external systems 122 via network 121. Web server 101 serves web pages, as well as other web-related content, such as Java, Flash, XML, and so forth. Web server 101 may include a mail server or other messaging functionality for receiving and routing messages between social networking system 100 and one or more user devices 123. The messages can be instant messages, queued messages (e.g., email), text and SMS messages, or any other suitable messaging format.

The Application Programming Interface (API) request server 106 allows one or more external systems 122 and user devices 123 to access information from social networking system 100 by calling one or more APIs. API request server 106 may also allow external systems 122 to send information to social networking website by calling APIs. An external systems 122, in one embodiment sends an API request to social networking system 100 via network 121 and API request server 106 receives the API request. API request server 106 processes the request by calling an API associated with the API request to generate an appropriate response, which API request server 106 communicates to the external systems 122 via network 121. For example, responsive to an API request, API request server 106 collects data associated with a user, such as the user's connections that have logged into the external systems 122, and communicates the collected data to the external systems 122. In another embodiment, a user device 110 communicates with social networking system 100 via APIs in the same manner as external systems 122.

Action logger 102 is capable of receiving communications from web server 101 about user actions on and/or off social networking system 100. Action logger 102 populates action log 107 with information about user actions, enabling social networking system 100 to discover various actions taken by its users within social networking system 100 and outside of social networking system 100. Any action that a particular user takes with respect to another node on social networking system 100 is associated with each user's profile, through information maintained in action log 107 or in a similar database or other data repository. Examples of actions taken by a user within the social network 130 that are identified and stored may include, for example, adding a connection to another user, sending a message to another user, reading a message from another user, viewing content associated with another user, attending an event posted by another user or other actions interacting with another user. When a user takes an action within social networking system 100, the action is recorded in an action log 107. In one embodiment, the social networking system maintains action log 107 as a database of entries. When an action is taken within social networking system 100, an entry for the action is added to action log 107. In one embodiment, action log 107 may be referred to as an action log.

Additionally, user actions may be associated with concepts and actions that occur within an entity outside of social networking system 100, such as an external systems 122 that is separate from social networking system 100. For example, action logger 102 may receive data describing a user's interaction with an external systems 122 from web server 101. In this example, the external systems 122 reports a user's interaction according to structured actions and objects in the social graph. The received interaction may include, in one embodiment, a graph object and a graph action that were defined by a graph definition module 103. Action logger 102 would interpret the received interaction according to the definition of the graph action and graph object. For example, an action logger 102 may receive an interaction that includes a user's unique identifier, a graph action called "watch," and a graph object called "show." Action log 107 would be populated with this received information. Other examples of actions where a user interacts with an external systems 122 include a user expressing an interest in an external systems 122 or another entity, a user posting a comment to social networking system 100 that discusses an external systems 122 or a web page 122a within the external systems 122, a user posting to social networking system 100 a Uniform Resource Locator (URL) or other identifier associated with an external systems 122, a user attending an event associated with an external systems 122 or any other action by a user that is related to an external systems 122. Thus, action log 107 may include actions describing interactions between a user of social networking system 100 and an external systems 122 that is separate from social networking system 100.

Authorization server 117 enforces one or more privacy settings of the users of social networking system 100. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 122 or any entity that can potentially access the information. The information that can be shared by a user comprises user profile information like profile photo, phone numbers associated with the user, user's connections, actions taken by the user such as adding a connection, changing user profile information and the like.

The privacy setting specification may be provided at different levels of granularity. For example, the privacy setting may identify specific information to be shared with other users. For example, the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 122. One embodiment allows the specification of the set of entries comprise an enumeration of entities, for example, the user may provide a list of external systems 122 that are allowed to access certain information. Another embodiment allows the specification to comprise a set of entities along with exceptions that are not allowed to access the information. For example, a user may allow all external systems 122 to access the user's work information but specify a list of external systems 122 that are not allowed to access the work information. Certain embodiments call the list of exceptions that are not allowed to access certain information a block list. External systems 122 belonging to a block list specified by a user are blocked from accessing the information specified in the privacy setting. Note that the various combinations of granularity of specification of information and the granularity of specification of entities with which information is shared are possible, i.e., all personal information may be shared with friends whereas all work information may be shared with friends of friends.

Authorization server 117 contains logic to determine if certain information associated with a user can be accessed by a user's friends, external systems 122 and/or other applications and entities. An external systems 122 that attempts to access a user's comment about a URL associated with the external systems 122 may also need authorization from authorization server 117 to access the user's more private and sensitive information, such as the user's work phone number. Based on the user's privacy settings, authorization server 117 determines if another user, an external systems 122, an application or another entity is allowed to access information associated with the user, including information about actions taken by the user. In one embodiment, authorization server 117 uses a users privacy setting to determine if the user's comment about a URL associated with the external systems 122 can be accessed by the external systems 122. The user's privacy setting may specify which other users, or other entities, are allowed to receive data about the user's actions or other information associated with the user.

Additionally, social networking system 100 maintains data about objects with which a user may interact with. To maintain this data, user profile store 110 and connection store 111 store instances of the corresponding type of objects maintained by social networking system 100. Each object type has information fields that are suitable for storing information appropriate to the type of object. For example, user profile store 110 contains data structures with fields suitable for describing a user's profile. When a new object of a particular type is created, social networking system 100 initializes a new data structure of the corresponding type, assigns a unique object identifier to it, and begins to add data to the object as needed. This might occur, for example, when a user becomes a user of social networking system 100, social networking system 100 generates a new instance of a user profile in user profile store 110, assigns a unique identifier to the user profile, and begins to populate the fields of the user profile with information provided by the user.

Connection store 111 includes data structures suitable for describing a user's connections to other users, connections to external systems 122 or connections to other entities. Connection store 111 may also associate a connection type with a user's connections, which may be used in conjunction with the user's privacy setting to regulate access to information about the user.

Data stored in connection store 111, user profile store 110 and action log 107 enables the social networking system 120 to generate a social graph that uses nodes to identify various objects and edges connecting nodes to identify relationships between different objects. An edge between two nodes in the social graph represents a particular kind of connection between the two nodes, which may result from an action that was performed by one of the nodes on the other node.

For example, if a first user establishes a connection with a second user in the social networking system, user profiles of the first user and the second users from user profile store 110 may act as nodes in the social graph. The connection between the first user and the second user stored by connection store 111 is an edge between the nodes associated with the first user and the second user. Continuing this example, the second user may then send the first user a message within social networking system 100, which is identified by action logger 102 and stored in action log 107. The stored action of sending the message is another edge between the two nodes in the social graph representing the first user and the second user. Additionally, the message itself may be identified from action log 107 and included in the social graph as another node connected to the nodes representing the first user and the second user.

In another example, a first user may tag a second user in an image that is maintained by social networking system 100 (or, alternatively, in an image maintained by another system outside of social networking system 100). The image may itself be represented a node in social networking system 100. This tagging action may create edges between the first user and the second user as well as create an edge between each of the users and the image, which is also a node in the social graph. In yet another example, if a user confirms attending an event, the user and the event are nodes obtained from user profile store 110, where the attendance of the event is an edge between the nodes that may be retrieved from action log 107. By generating and maintaining the social graph, social networking system 100 includes data describing many different types of objects and the interactions and connections among those objects, providing a rich source of socially relevant information.

Building upon this understanding of a social graph, which comprises nodes and edges, the social graph can be "opened" by enabling third-party developers and external systems 122 to define objects and actions to be published to the social graph. As previously discussed, a graph definition module 103 may be linked to graph action type store 112 and a graph object type store 114. Graph definition module 103 enables the creation of actions and objects that imitate real-world interactions. An action such as "watched" may include various properties, such as a location where the action took place, the user or users taking part in the action, and a time duration field to record how long the user performed the action. The resulting graph action type may, in one embodiment, be stored in graph action type store 112. Objects such as "film," "TV show," "genre," and "station" may be defined using the graph object type store 114 to have object properties, such as visual object type, auditory object type, musical object type, performing arts object type, and the like. These graph object types are stored in graph object type store 114.

In one embodiment, graph definition module 103 defines certain actions to be performed on certain objects. For example, an administrator of social networking system 100 may define the "watch" action to only be performed on visual object types, such as "film," "show," "genre," and "station" objects. Thus, a third-party developer that may desire to define a "speech" object that users can perform the action, "listen" may define his "speech" object as an auditory object type such that the "listen" action may be performed on it.

In another embodiment, graph definition module 103 enables actions to be performed on any object, leaving the semantics to the third-party developer who utilizes actions and objects on the markup language document 114 that is interpreted by the widget. Thus, in this embodiment, a third-party developer may utilize the "listen" action with a "user" object in a voice-over-IP application phone call between a user of social networking system 100 and a user of the voice-over-IP application. If the user of the voice-over-IP application is not a user of social networking system 100, then only the information received from the external systems 122 may be used in action log 107 to be published in the newsfeed or stream in social networking system 100. Thus, context-free grammars may be utilized to capture external user interactions and integrate them into social networking system 100.

A graph publisher API 108 assembles received actions and objects into newsfeed stories or other content items in the stream of content items in social networking system 100, in one embodiment. In another embodiment, graph publisher API 108 responds to an API call from an external systems 122 to retrieve user interactions on the external systems 122. Graph publisher API 108 utilizes the definitions of the actions and objects to determine how to publish the data into the social graph of social networking system 100. In one embodiment, the markup language document 114 includes an instruction to social networking system 100 to publish every action taken on the external systems 122 as a newsfeed story or content item in the stream. In another embodiment, the markup language document 114 includes an instruction to social networking system 100 to publish actions taken on the external systems 122 in batches or in aggregate. Note that social networking system 100 may passively publish these content items into the user's stream on social networking system 100 because of prior authorization provided to the external systems 122. If such authorization to post content items into the stream has not been given by the user, then a dialog box requesting permission would prompt the user.

A graph translation module 105 enables social networking system 100 to dynamically form sentences based on the structured objects and actions generated on external systems 122, such as applications that indicate a number of miles run during a workout or top artists listened to this week. The metadata about these objects, for example, artist objects and workout objects, may be utilized by graph content item ranking module 104 to rank the content items generated from these external user interactions, in one embodiment. The metadata about these objects may be published to a newsfeed stream, added to a user's profile, or displayed via a plug-in (e.g., an iframe) on an external systems 122 that interface with social networking system 100. Separate modules of social networking system 100 may determine a reputation score for applications and/or external systems 122 to identify spam, or unwanted applications. An application's reputation score, indicating a likelihood of spam, is utilized by graph content item ranking module 104 in determining ranking scores for content items generated by the application. The reputation score may be determined from a number of factors, including behavior of the application gathered from heuristics analysis, reports from users that the application is spam, annoying, or offensive, and blacklists that indicate the application is spam.

Another global factor that may be applied to a graph content item ranking score is an overall quality of an application that produces the content item. The quality of an application may be determined via separate modules, and the factors considered in judging the quality of an application may include user engagement with the application, popularity of the application among all users of social networking system 100, consistency of the application behavior observed by social networking system 100, reputation of the authors of the application, and an average rating of the application by users and administrators of social networking system 100. In one embodiment, the overall quality of an application may be represented as an application quality score, and the application quality score is taken as a factor in ranking content items for display to a viewing user.

User-specific factors may also be applied to the ranking of a graph content item. These user-specific factors include weights to other users connected to the viewing user and weights to applications and interests that are preferred by the viewing user. For example, a viewing user may have over 1000 connections to other users on a social networking system 130, but may only interact with 20 of those users on a daily basis through sharing, commenting, expressing approval of and selecting links embodied within content items generated by the subset of users. Thus, content items from those users in the subset may be ranked higher by graph content item ranking module 104. Additionally, content items generated by applications that are preferred by the viewing user, as determined from observed click-through rates, whether the user has installed the application generating the content item, time elapsed since interacting with the application, and number of interactions with the application, may also be ranked higher by graph content item ranking module 104. A viewing user's preferences for applications, interests, and other concepts may be stored as affinity scores in a user profile object associated with the viewing user in user profile store 110.

As an example, a viewing user may be very interested in Lady Gaga, as indicated by an affinity score for Lady Gaga in the user profile object associated with the user. Affinity scores may be computed by separate modules for various interests, nodes, and users of social networking system 100 based on an explicitly stated interest by users on their profile pages or implied interest by actions of users and their connections on social networking system 100 and external systems 122. In one embodiment, the artist object for Lady Gaga is associated with the viewing user's user profile object with a high affinity score. Content items associated with Lady Gaga that were generated on an external systems 122.

Graph content item ranking module 104 may include a recommendation engine highlights objects that may be of interest to a viewing user based on past interactions with other objects, the expressed interests of the viewing user, and the past interactions with other objects by other users connected to the viewing user. Object-to-object similarity analysis may be determined by the recommendation engine asynchronously. Additionally, the recommendation engine may log of what object types have been displayed to a user and, in an effort to diversify the object types presented to the user, it may also recommend object types that have not been recently displayed, in one embodiment. Recommendations may influence a ranking score generated by graph content item ranking module 104 in varying intensities, such as by increasing a ranking score exponentially, linearly, or logarithmically. In one embodiment, an object owner, brand owner, or other third-party may purchase a boost in the ranking score through a user interface on the social networking system. For example, a purchase of a book on an electronic retailer that was communicated to the social networking system as a graph action instance performed by a user of the social networking system may be boosted in the rankings of recommendations to a viewing user connected to the user if the publisher of the book purchased a premium placement for the book within the recommendations for the viewing user of the social networking system.

Graph data may be stored and indexed in graph data store 113. Graph data store 113 includes data structures suitable for describing the graph data received from external systems 122. In one embodiment, graph data may be received from within social networking system 100, such as users sharing stories with other users that include graph data, users playing a song that was shared within their newsfeed stream of stories on social networking system 100, users purchasing a product from within an application on social networking system 100, and users watching a video from a playlist that was shared in a message from other users of social networking system 100. Graph data may include custom graph actions, actors (users performing custom graph actions), custom graph objects, and properties of the custom graph actions and custom graph objects that have been defined by entities external to social networking system 100.

When graph data is received, social networking system 100 may search for the graph data in graph data store 113 and add data to the object as needed. This might occur, for example, when a user watches a program or show previously watched on an external systems 122. In this case, the graph data corresponding to the show object may be modified to reflect the new watch action. Graph integration module 116 may interact with graph data store 113 to provide a user interface on the user's user profile page on social networking system 100 that reflects the new watch action. Because graph data may be collected about similar objects from multiple domains, such as Spotify, iTunes, Rovi, proprietary EPG data from MSOs, and RDIO, a virtual object may be created by social networking system 100 and stored in graph data store 113. As watch action instances are received from multiple domains performed on the same TV show, as identified by social networking system 100 by the title of the show, actors, producer, and duration, graph data store 113 is accessed to identify the virtual object that represents the show objects that are associated with the watch action instances. The watch action instances are then associated with the virtual object created by social networking system 100 that represents the similar show objects as determined by social networking system 100. In this way, social networking system 100 may report a newsfeed story that includes the watch action and the virtual object for a particular show, such as "The Office", regardless of whether the show was watched on iTunes, Netflix, Hulu, Google TV, Comcast, AT&T U-Verse, Dish Network, Time Warner Cable, or any other video content provider. In one embodiment, the newsfeed story may include the domain, or video service, on which the show was watched, but may enable the user to access the show on a different domain or content delivery service from within the newsfeed story on the social networking system. In another embodiment, a user may add a geographic location to a custom graph action instance, indicating where the graph action was performed. Virtual objects may be generated by a social networking system 100 for other types of custom graph objects, such as news stories, commercial products, videos, concerts, theatre shows, songs, and so on.

Graph integration module 116 utilizes action types and object types defined by graph definition module 103 that are stored in graph object type store 114 and graph action type store 112 to integrate user interactions on external systems 122 with social networking system 100. For example, a streaming video service may enable users to watch content on an external systems 122, such as a website or a mobile application. In one embodiment, social networking system 100 may associate buttons and links on user interfaces with requests sent to an embedded web server on an external systems 122 hosting the streaming music service. The requests trigger the actions requested, such as queuing a video hosted on an external server. This allows users to share TV shows and movies with their friends on social networking system 100 via a hyperlink. The selection of the link generates a request to the external systems 122 to execute the action, in this case queuing the video or show through the user device 123 accessing social networking system 100 via network 121.

Figure 2:
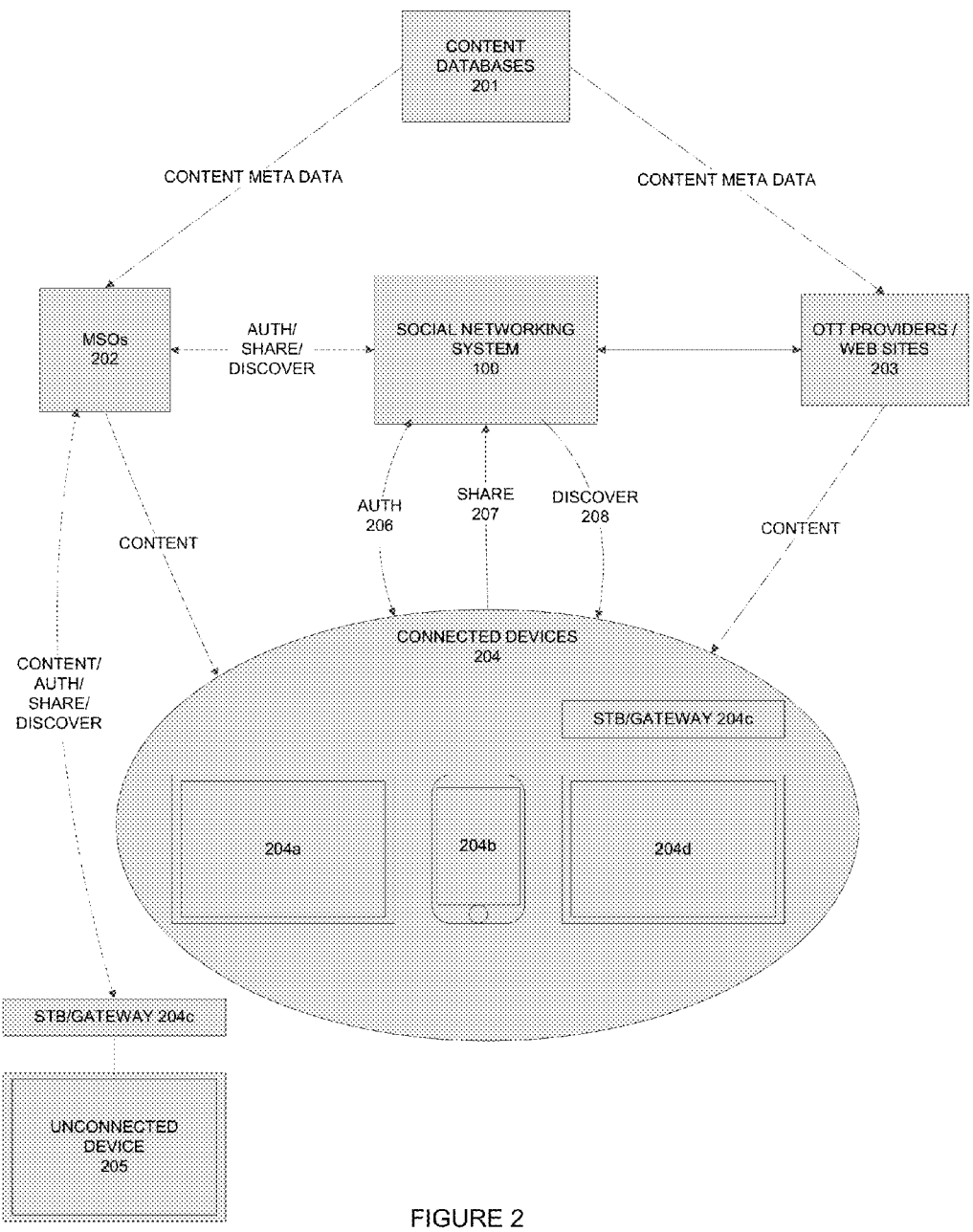
FIG. 2 illustrates an example computer network environment of an example social-network environment.

FIG. 2 illustrates an example network environment for an example social networking system enabling social TV viewing. Social networking system 100 may be connected via internet 121 to a plurality of connected devices 204. Connected devices 204 may include, without limitation, Internet-enabled television sets 204a that connect to network 121 through a local internet service provider (ISP), mobile devices 204b that connect to network 121 through a wireless connection such as a wireless cellular data network, or TVs 204d that connect to the Internet (network 121) through a STB or gateway device 204c. STB/gateway 104c may be any hardware or software that delivers content or possesses a network interface card (NIC) for connecting to a local area network (LAN). For example, STB/gateway 204c may be a cable box provided by an MSO, such as Comcast, Time Warner, AT&T U-verse, or Dish Network. In such examples, STB may receive content from MSOs 202. As another example, STB/gateway 204c may be a device that streams video from third-party internet sites or services such as OTT providers 203. Examples of such gateways 204c include, without limitation, devices from Roku, Boxee, Apple TV, and Google TV allow users to access content from OTT providers 203 such as NetFlix, Hulu, Amazon Video, YouTube, and the like.

In particular embodiments, connected devices 204 receive content from MSOs 202 or OTT providers 203 while receiving or transmitting social data to social networking system 100. For example, a user watching a particular TV show or movie on either service may choose to share that he or she is currently viewing the program to his or her friends. Conversely, a user browsing the EPG of an MSO 202 or the content navigator of an OTT provider 203 may be presented with social data including the content that his or her friends on social networking system 100 have watched, are currently watching, or plan to watch. Thus, after exchanging auth messages 206 with social networking system 100 to authenticate the user's social networking identity with his or her connected device 204, connected devices 204 may receive discover messages 208 that identify content being consumed or watched by his or her friends on the social network, and transmit share messages 207 to inform social networking system 100 of what the user has, is, or plans to watch or "consume." Although FIG. 2 depicts these messages as being transmitted directly between social networking system 100 and connected devices 204, in particular embodiments, authorization, share, and discover messages 206, 207, and 208 may be exchanged between the provider from which content is being accessed, namely, MSOs 202 and OTT providers 203. This disclosure contemplates any suitable means of routing messages from viewing devices 204 to social networking system 100.

Although increasingly rare, there are scenarios wherein a particular user of the social networking system has no means of linking his TV or viewing device to social networking system 100. Unconnected devices 205 lack any means of connecting to Internet/network 121. For example, a user may not have a local ISP, and only TV service from an MSO. As another example, a user may have both cable service from an MSO as well as internet access from a local ISP, but his or her STB 204c may not include a NIC. In such configurations, MSO 202 communicates authorization, share, and discover messages with social networking system 100, and unconnected devices 205 communicate, via STB 204c, only with MSOs 202.

In particular embodiments, content may be delivered to user devices 204 and 205 tagged with content identifiers and metadata. For example, Comcast may utilize its own proprietary EPG data format that lists the program name, air date, actors, producer, director, etc. In particular embodiments, content providers 202 and 203 may obtain content identifiers and metadata from content databases 201, such as the Rovi Corporation. Each particular piece of content may be transmitted from devices 204, or, in particular embodiments, via content providers 202 and 203, as graph data including a graph object and graph action. As previously discussed, social networking system 100 may de-duplicate graph data for the same graph object in graph data store 113 by comparing various attributes about the content object; for example, name, actors, duration, air date, etc. Thus, social networking system 100 may attribute graph data transmitted from Hulu that a particular user watched the critically-acclaimed feature film "The Marine" to the same graph object as a user currently watching "The Marine" on Comcast digital cable, irrespective of the source and format of the content metadata.

Figure 3:
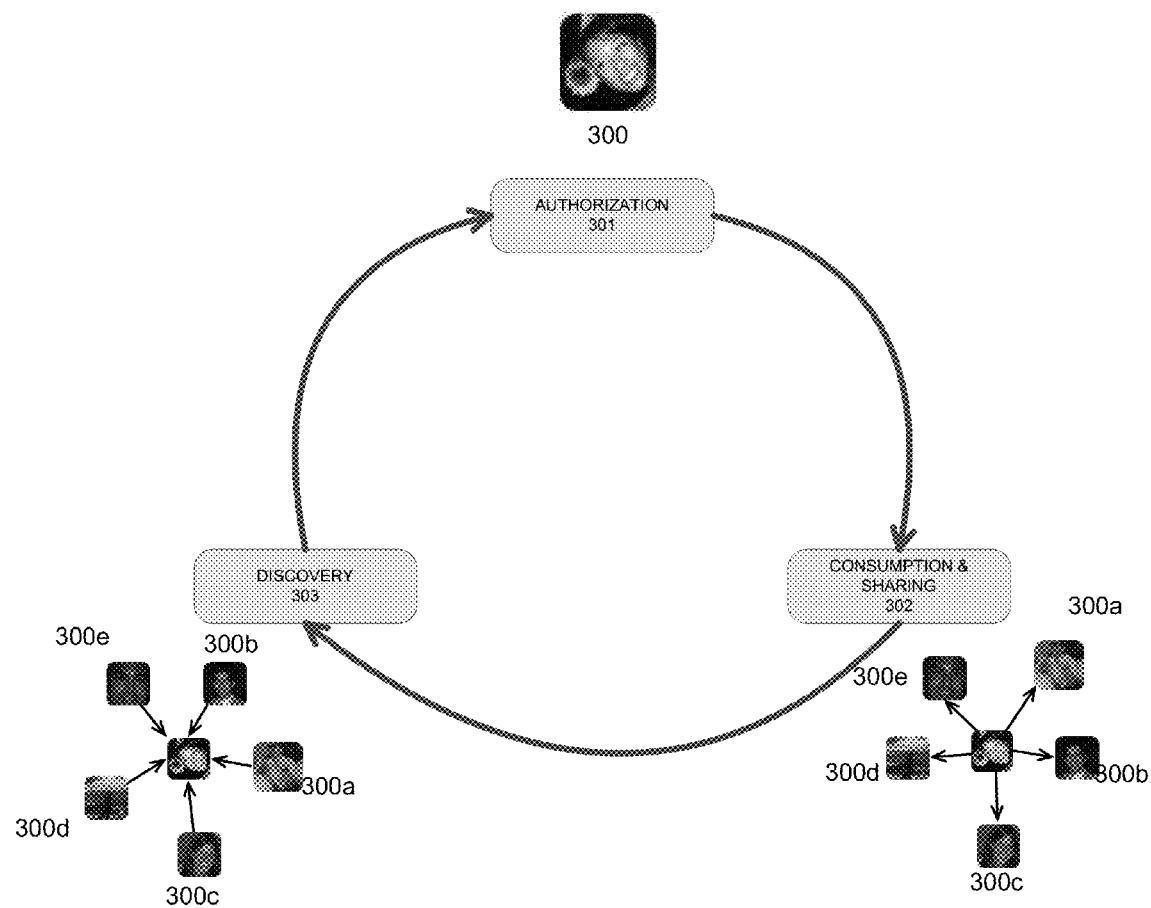
FIG. 3 illustrates an example process cycle for sharing television and video programming through social networking

FIG. 3 conceptually illustrates a cycle of sharing of watched video content. At authorization phase 301, a particular user 300 authenticates her social networking user identifier with a device 204 or 205 on which she wishes to browse or view content. As previously discussed, devices 204/205 may be any device on which a user may view content, including a personal computing device including a browser application 124 viewing a website of an OTT provider 203, television, or mobile device running a dedicated application for a content provider. In particular embodiments, a user may associate accounts on multiple external services 122 with his or her social networking identifier, and permit external services 122 query the social graph or publish graph data to social networking system 100. For example, user 300 may associate her Hulu account, Netflix account, and ATT U-Verse account with her social networking user identifier and password, thereby sharing all content across multiple content delivery services with the social network, and therefore, her friends on the social network.

At consumption & sharing phase 302, user 300 consumes content by watching or queuing video content, and shares a story of the consumption with social networking system 100. In particular embodiments, user 300 may explicitly share a story of her consumption of the content with social networking system 100 by actively selecting sharing buttons on a user interface. Such embodiments are described in further detail with reference to FIG. 7. In particular embodiments, sharing occurs passively without user selection. Such embodiments are described in further detail with reference to FIG. 10. When stories of content consumption by user 300 are transmitted to social networking system 100, the friends 300a-e of user 300 may view the sharing stories, thereby discovering new content to consume. In particular embodiments, user 300 may specify which of her friends 300a-e may view her consumption stories. In particular embodiments, user 300 may have different privacy settings for actively and passively shared consumption stories At discovery phase 303, user 300 may view consumption stories published by her friends 300a-e. As previously stated, the ability of user 300 to view consumption stories published by the user's friends 300a-e depends on the privacy settings of each individual user 300a-e. Thus, the conceptual framework of FIG. 3 describes a cycle where users are constantly discovering new content shared by their friends, consuming content, and sharing content with their friends. Hence the user experience both on and off social networking system 100 is enhanced.

Figure 4:
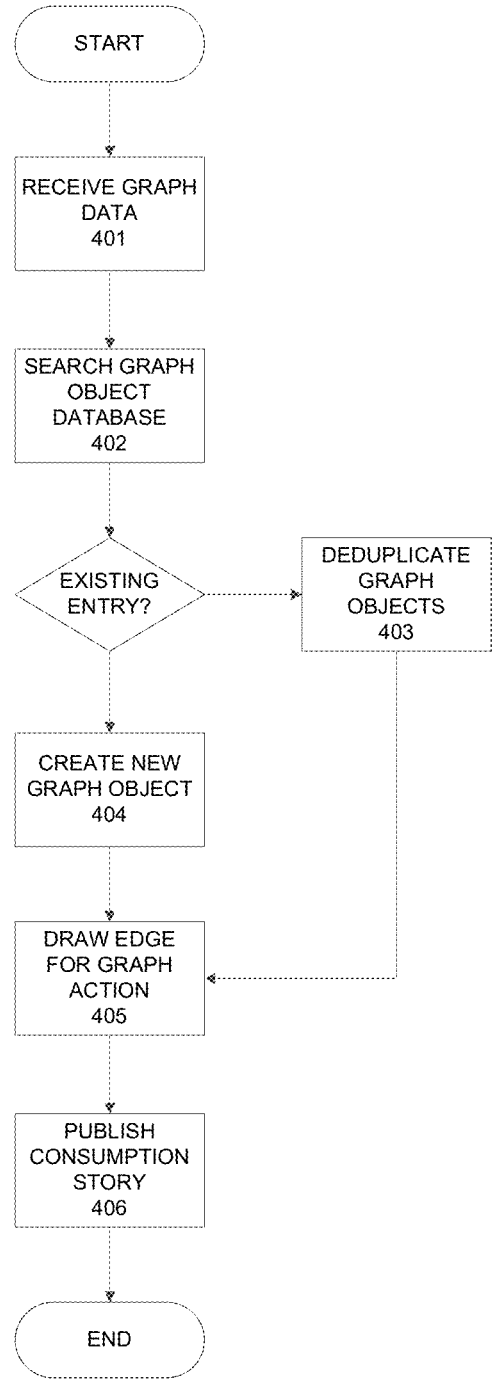
FIG. 4 illustrates an example method for mapping content from multiple services to a single content identifier.

FIG. 4 illustrates a method for mapping content identifiers from graph data received from external system 122 to singular content identifiers for sharing. At Step 401, social networking system 100 receives graph data from an external system 122 such as an MSO 202 or OTT provider 203. Alternatively, social networking system 100 may receive graph data directly from connected devices 204. In particular embodiments, the graph data may have a content object with one or more attributes, and a graph action, such as "watching", "watched," "scheduled", "liked" or "share." In particular embodiments, each content object may also have a plurality of object attributes or metadata for the content object. For example, Comcast may transmit a consumption story as graph data, including a content identifier, to social networking system 100 in its own proprietary data format, including a title, date, actors, motion picture association of America (MPAA) rating, and duration for the content object.

At Step 402, social networking system 100 may search graph data store 113 for graph objects having the same title. In particular embodiments, social networking system 100 may compensate for particular differences in formatting by considering two titles to match if a predetermined percentage of words or characters are identical. For example, social networking system 100 may consider "The Office" and "Office, The" to be matches, despite differences in ordering.

If social networking system 100 determines that the received graph object has an existing content identifier in graph data store 113, social networking system 100 proceeds to deduplicate the received graph object at Step 403. As previously discussed, social networking system 100 may perform further checks to determine that the content object received from external system 122 is the same content object as the content identifier stored in graph data store 113. For example, social networking system may compare actor names, run date, MPAA rating, duration, and other metadata received from external system 122 to metadata or object attributes for the content identifier in graph data store 113. In particular embodiments, a certain percentage of matching metadata indicates that the objects are the same. In particular embodiments, certain metadata fields may be weighted more heavily or given greater importance. For example, because literally thousands of programs air per year, the air date may be weighted very lightly in comparison to, for example, the lead actors. In particular embodiments, social networking system 100 may have access to one or more content databases 201, and may build graph data store 113 with attributes pulled from content databases 201. This disclosure contemplates any suitable method of de-duplicating a received content object and a content identifier in graph data store 113.

At Step 404, if social networking system determines that the received content object does not match any existing content identifiers in graph data store 113, social networking system 100 creates a new graph object for the received content object. In particular embodiments, the created graph object may be a virtual graph object. In particular embodiments, metadata received from external systems 122 may be used to populate object attributes of the created graph object. In particular embodiments, social networking system may compare a particular piece of received metadata to all content object attributes in graph data store 113 in order to populate the correct object attribute with the metadata. For example, if graph data is received a piece of metadata with "George Clooney," social networking system 100 may search the string "George Clooney" across all content object attributes in graph data store 113 and assign the metadata to the object attribute of the newly-created virtual object in which matches arise, in this example, the "Actors" object attribute. This disclosure contemplates any suitable method of creating a new graph object and populating the object attributes of the newly created object with received metadata.

At Step 405, social networking system draws an edge between the user ID contained in the received graph data and the graph object (either a new virtual graph object created in Step 404, or the content identifier identified in Step 403). As previously discussed, the graph action may be of any type and defined by a third-party. In particular embodiments, social networking system 100 may define a set of social TV actions that may be standard among all social TV API users. In particular embodiments, social networking system may perform a similar deduplication of graph actions, such that a graph action received from Hulu, such as "watched on Hulu Plus" is mapped to a universal graph action "watched." This disclosure contemplates any suitable method of creating and drawing graph actions between user nodes and objects.

At Step 406, social networking system 100 publishes the story of the user's consumption. The story may be published through a number of different channels. In particular embodiments, the story appears on the wall of the user. In particular embodiments, the story appears in the newsfeed of the user's friends. In particular embodiments, the story is published to an external system 122. In particular embodiments, the story is published to a social plug-in that may be embedded in a portion of a user's social networking profile page. For example, the user may wish to include a "currently watching" widget on a portion of his or her profile page. This disclosure contemplates any suitable method of publishing a consumption story received by the social networking system.

Figure 5:
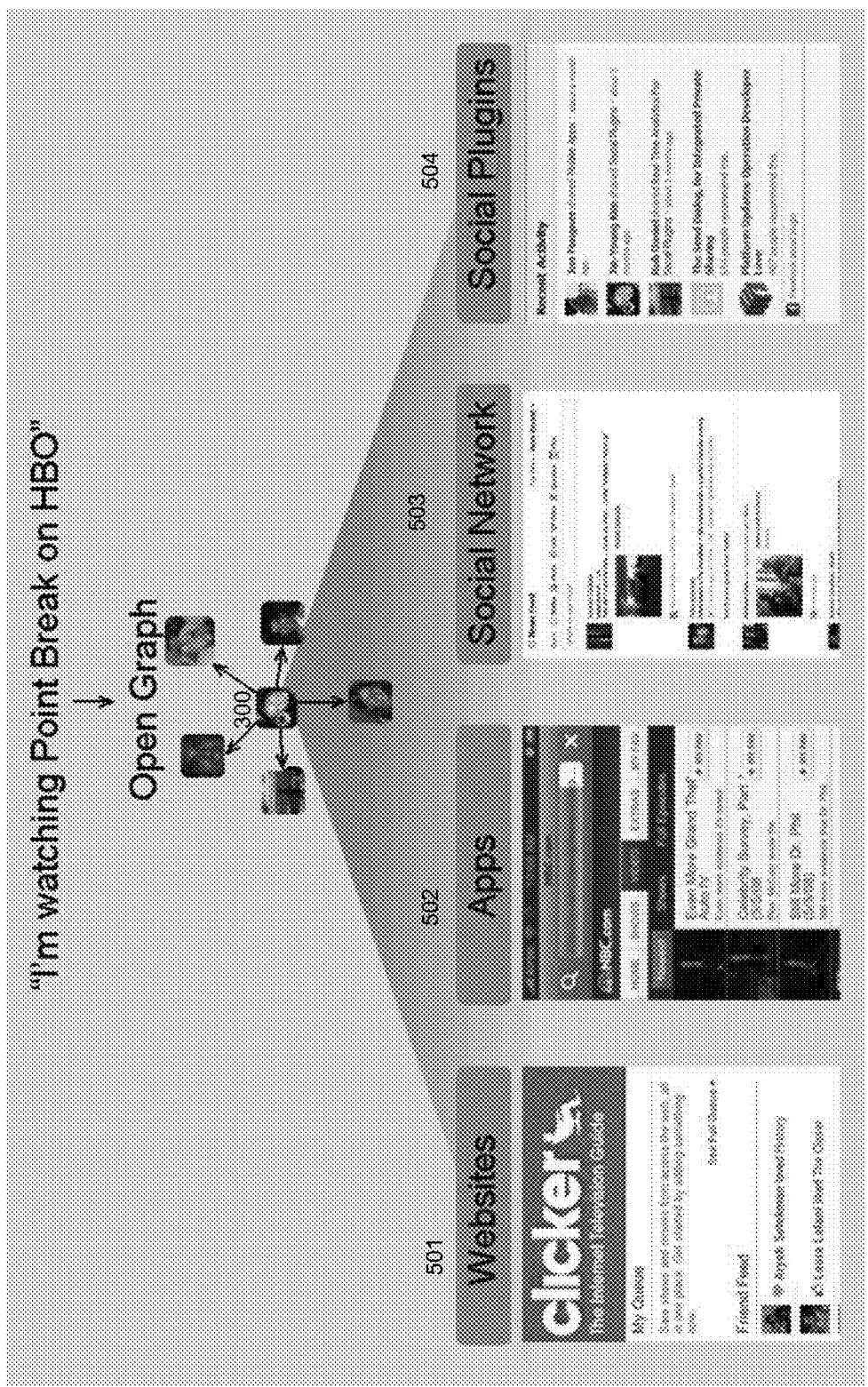
FIG. 5 illustrates example sharing of a story regarding a content object to multiple external services.

FIG. 5 conceptually illustrates publishing a consumption story across multiple distribution channels. In FIG. 5, user 300 shares a statement to social networking system 100 (and consequently, the friends of user 300) that she is currently watching the film, "Point Break." As discussed above, social networking system 100 processes the graph data received from the content service provider from which user 300 is watching "Point Break," and processes the graph data to map it to a single content identifier. The resultant story may be published to a number of channels, such as websites 501, applications 502, the social networking system itself 501, and social plug-ins 504.

In particular embodiments, consumption stories are not "pushed" to distribution services 501-504, but rather the service issues a request to social networking system 100 to query the social graph. For example, when a user logs into the clicker website 501 with their social networking ID, a script of plug-in embedded in the markup language delivered to the user device may issue a query to the social graph containing the user's social networking identifier. In response, social networking system 100 may return all the user's friends consumption stories, and the plug-in may display the consumption stories on a predetermined portion of the page. In particular embodiments, the external system 122, in this example Clicker, is responsible for mapping social graph content identifiers received from social networking system 100 to content on its own website.

As another example, when a user accesses a mobile application, such as, for example, the NBC.com mobile application of 502 on his or her mobile device (such as an iPhone or iPad), the application may issue a query to the social graph for consumption stories of the friend whose account is associated with the mobile device. In particular embodiments, social networking system 100 is responsible for the mapping from social graph content identifiers to the content identifiers used by external service 122. For example, if a user accesses his or her EPG on her AT&T U-Verse service, the social networking system may return data that associates published consumption stories with programs within the electronic programming guide.

Figure 6A:
FIG. 6A illustrates an example of an electronic program guide integrating social data.

FIG. 6A illustrates an example electronic programming guide (EPG) 600. EPG 600 includes the program schedule for channels 1002-1102 from a 7:00-8:00 PM block for a particular day. EPG 600 may be scrolled both vertically to access the schedule for different channels, and horizontally to access the schedule for different times. EPG 600 may also include user-selectable options to view the schedule for different dates. EPG 600 may be augmented by social data received from social networking system 100. For example, after the user has associated his social networking identification with his viewing device, in this example, a STB accessing his cable account, EPG 600 may include icons beneath particular shows to indicate the existence of one or more consumption stories related to the show. The one or more icons may also include a summary of the consumption story. For example, the icon under the show "House" playing at 7:00 PM on channel 1002 states that one of the user's friends, "Marcus Smith" is currently watching the program. As another example, the icon under the show "The Sing Off" at 7:00 PM on 1004 indicates that three of the user's friends are recording the show. As another example, the social data in EPG 600 may also indicate that users are scheduled to record a particular show, such as the EPG entry for "The Vampire Diaries." In addition, EPG 600 may include, for each show, indicators that friends of the user have otherwise expressed an affinity or connected with the show. For example, EPG 600 includes several "thumbs up" icons indicating that friends of the user "liked" a particular show. In particular embodiments, these "thumbs up" icons may also include a summary of the "like" stories. This disclosure contemplates the display of any relevant social data.

Figure 6B:
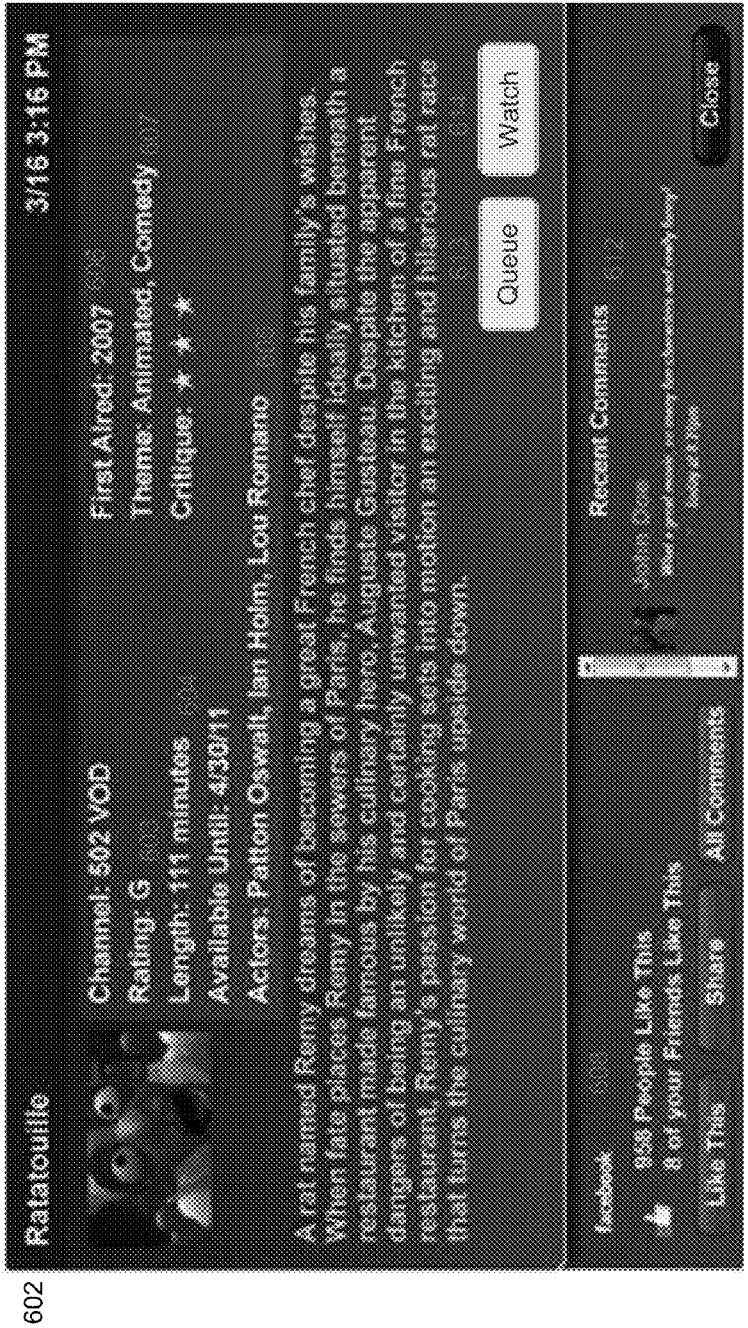
FIG. 6B illustrates another example of an electronic program guide integrating social data.

FIG. 6B illustrates an example EPG entry 601 when a user chooses to view information for a particular show or program. In particular embodiments, the user may view detailed information about a particular piece of content by selecting the show in EPG 600 and selecting "more" or "info" on his or her remote control. EPG entry 601 includes the program title 602 and metadata 603-607 obtained from the content service provider or content database 201. In particular embodiments, metadata may include the MPAA rating 603, duration 604, actor 605, air date 606, and theme 607. In particular embodiments, EPG entry 601 may also include a synopsis or summary of the program. This disclosure contemplates the inclusion of any suitable metadata in EPG entry 601.

EPG 601 also includes social portion 608. In particular embodiments, EPG 601 is delivered to the user as a markup language document, and social portion 608 is a block of code in the markup document functioning as a widget or plug in. This disclosure contemplates any suitable method of rendering and implementing social portion 608. Social portion 608 may include social data specific to the user associated with the viewing device. For example, when the user's STB requests EPG entry 601, the STB may also issue a query to the social graph including the user's social networking identification and the title of the program 602. In response, social networking system 100 may map the program title 602 to a particular graph object or content identifier as discussed with reference to FIG. 4, and return the friends of the user who have affinity ("like") edges with the graph object. In particular embodiments, social portion 608 may also include comments 612. Comments 612 may be retrieved from the page (also referred to as a "hub page" or "landing page") representing the content object on social networking system 100. In particular embodiments only comments from the user's friends or first-degree contacts from the hub page. In particular embodiments, comments may be pulled from an external site, such as rottentomatoes.com, or imdb.com. This disclosure contemplates retrieving comments or other social data from any suitable source. In particular embodiments, comments 612 may be arranged chronologically. In particular embodiments, they may be arranged by social value; that is, comments from close friends or users with whom the viewer of EPG 601 has a higher social coefficient are displayed first. This disclosure contemplates any suitable method of scoring or arranging comments 612 in social portion 608.

In particular embodiments, social portion 608 includes active or explicit sharing user interface elements. For example, social portion 608 includes "Like" button 609 and "Share" button 610. Selection of "like" button 609 transmits a request to social networking system 100 to draw a "like" edge in the social graph between the user node associated with the viewing device and the content object in graph data store 113. In particular embodiments, such a "like" action is published as a story to the user's wall, and to the user's friend's newsfeed. Similarly, selecting share button 610 may cause the user's STB to transmit a request to social networking system 100 to draw a "share" edge between the viewing user's social graph user node and the content object. This disclosure contemplates other buttons, such as "watch", "queue" or "schedule for recording" that similarly draw edges in the social graph for specific actions. This disclosure contemplates any suitable selection or arrangement of active sharing buttons 609, 610 that permit a user to take explicit action to share what he or she is watching or express an affinity for a particular show.

Figure 7:
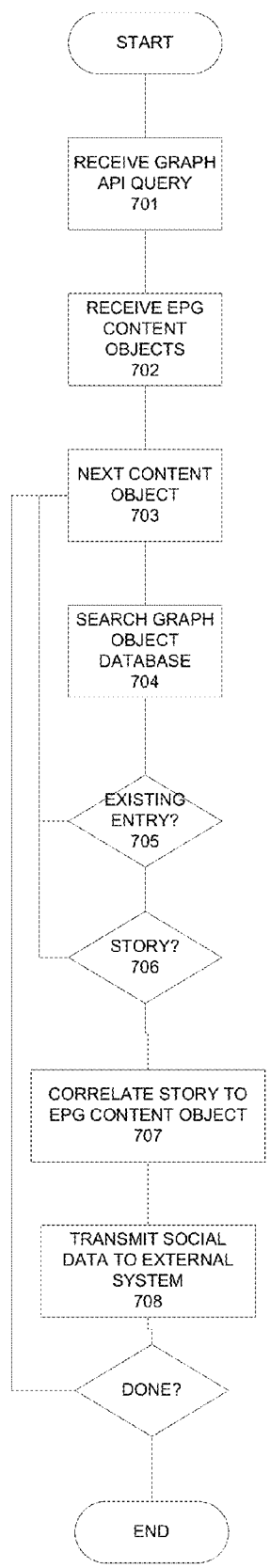
FIG. 7 illustrates an example method for transmitting social data and content identifiers in a format that may be interpreted more readily by external systems.

FIG. 7 illustrates a method for transmitting social data to an external system 122 from social networking system 100 in a format that may be interpreted by external system 122. Because external systems 122 may utilize EPG data in an arbitrary, proprietary format, there are challenges in mapping a particular show, for example, "It's Always Sunny in Philadelphia" to the content identifier for the same show in graph database 113 of social networking system 100 in both the "share" and "discover" phases. Thus, social data received from social networking system 100 (such as whether a user's friends are watching a show, have "liked" a show, etc.) must also be reconciled with EPG data. In particular embodiments, external systems 122 may implement a reverse matching procedure that maps incoming social networking content identifiers to their respective shows or programs in their EPG. In particular embodiments, such as the method of FIG. 7, external systems 122 issue a query to a social graph API through API request server 106 and transmit content identifiers for the shows that the user is currently browsing. For example, if the user is browsing EPG 600, external system 122 transmits the titles for all the shows visible in EPG 600. Similarly, if the user is browsing EPG 601, external system 122 transmits the title, "Ratatouille", to social networking system 100. In such embodiments, social networking system 100 performs a series of look-ups to correlate share actions of the user's friends to specific shows in EPG 600 or 601. Thus, social data is delivered from the social networking system 100 in a format that may be easily interpreted by external systems 122.

At Step 701, social networking system 100, via API request server 106, receives a request to query the social graph from an external system 122. In particular embodiments, Step 701 occurs simultaneously with user authentication, and may include the user's social networking identifier and password. In particular embodiments, Step 701 occurs after social networking system 100 has already authenticated the device, and has associated the user's social networking identifier with the device.

At Step 702, social networking system 100 receives one or more EPG content objects. In particular embodiments, such as when a user is viewing EPG 600, social networking system 100 receives a list of program titles. In particular embodiments, such as where a user is viewing a detailed EPG 601, social networking system receives a single program title from external system 122. In particular embodiments, external system 122 may transmit metadata along with the program titles.

At Step 703, social networking system iteratively begins searching for objects in graph data store 113 that match the program titles transmitted by external systems 122. In particular embodiments, social networking system performs the same method as Steps 402-403 in FIG. 4 to map EPG program titles to content objects. In particular embodiments, social networking system 100 may receive only EPG program titles, and request additional metadata from external system 122 if a suspected match is found.

If no existing match is found, social networking system 100 may iterate to the next EPG program title in the list of titles. In particular embodiments, social networking system 100 may create a virtual object for the title in graph data store 113. This disclosure contemplates any suitable action by social networking system 100 upon failure to find a matching entry in graph data store 113.

If an existing entry is found, social networking system 100 checks whether there exist any sharing stories from the user's friends about the content object. If so, the process moves to Step 707, where social networking system 100 correlates the sharing story to the EPG program title. In step 708, social networking system 100 transmits the social data comprising a sharing storing and an EPG program title, to external system 122. Thus, external system 122 can easily populate EPG 600 and 601 with received social data with minimal programming and content matching on its part.

The process then iterates through the entire list of received EPG program titles. In particular embodiments, a new request is transmitted from external system 122 to social networking system 100 every time the user's view changes. For example, if a user scrolls in EPG 600 vertically or horizontally, the user is presented with a new set of shows. Each time the user's view changes, a new request is transmitted to social networking system to determine whether there exist social stories on the viewable shows. Thus the user's view of EPG 600 is constantly updated with social stories.

The method of FIG. 7 is described for didactic purposes only. One of ordinary skill in the art can envision different methods that correlate EPG program titles with content identifiers on social networking system 100. For example, in particular embodiments, social networking system 100 may first obtain a list of all the user's friends' sharing stories, and perform a search of the received EPG program titles with the titles of the content objects. Such a method may greatly reduce the amount of searching necessary when the user is browsing EPG 600, as there will be necessarily fewer programs with stories than without. However, where the number of EPG program titles received is low, it may be faster to perform the exact method of FIG. 7. This disclosure contemplates any suitable method of populating EPG 601 and 600 with social data.

The examples of FIGS. 6A and 6B illustrate user interfaces provided by external system 122 wherein content data is supplemented with social data (i.e., sharing stories from the user's friends). Such user interfaces can be fairly simply implemented via the method of FIG. 7 and other similar methods with little effort on the part of external systems 122. However, FIGS. 8A and 8B illustrate example user interfaces provided by external systems 122 where the content objects themselves are determined by social data.

Figure 8A:
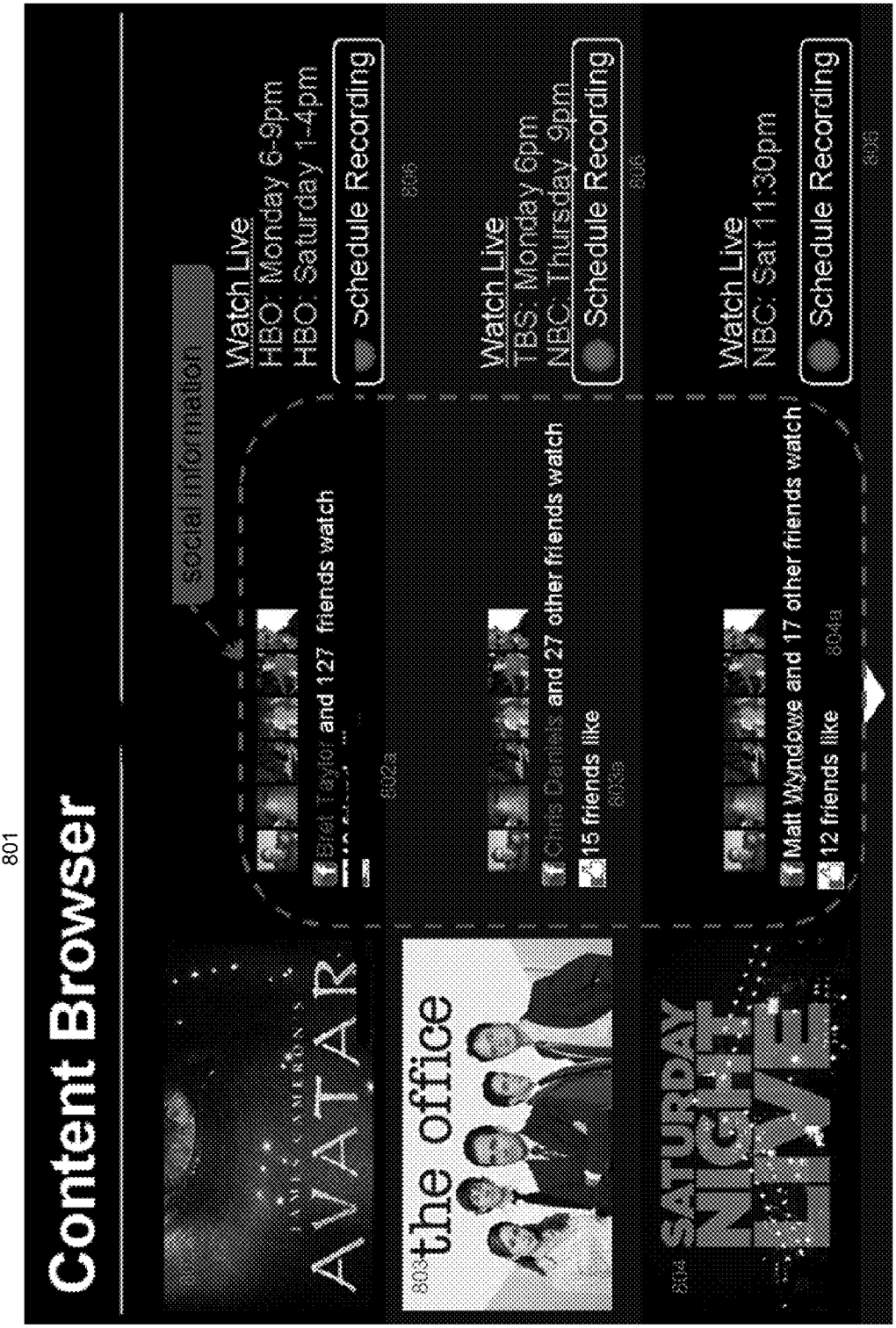
FIG. 8A illustrates an example of a content browser displaying content with integrated social data.
Figure 8B:
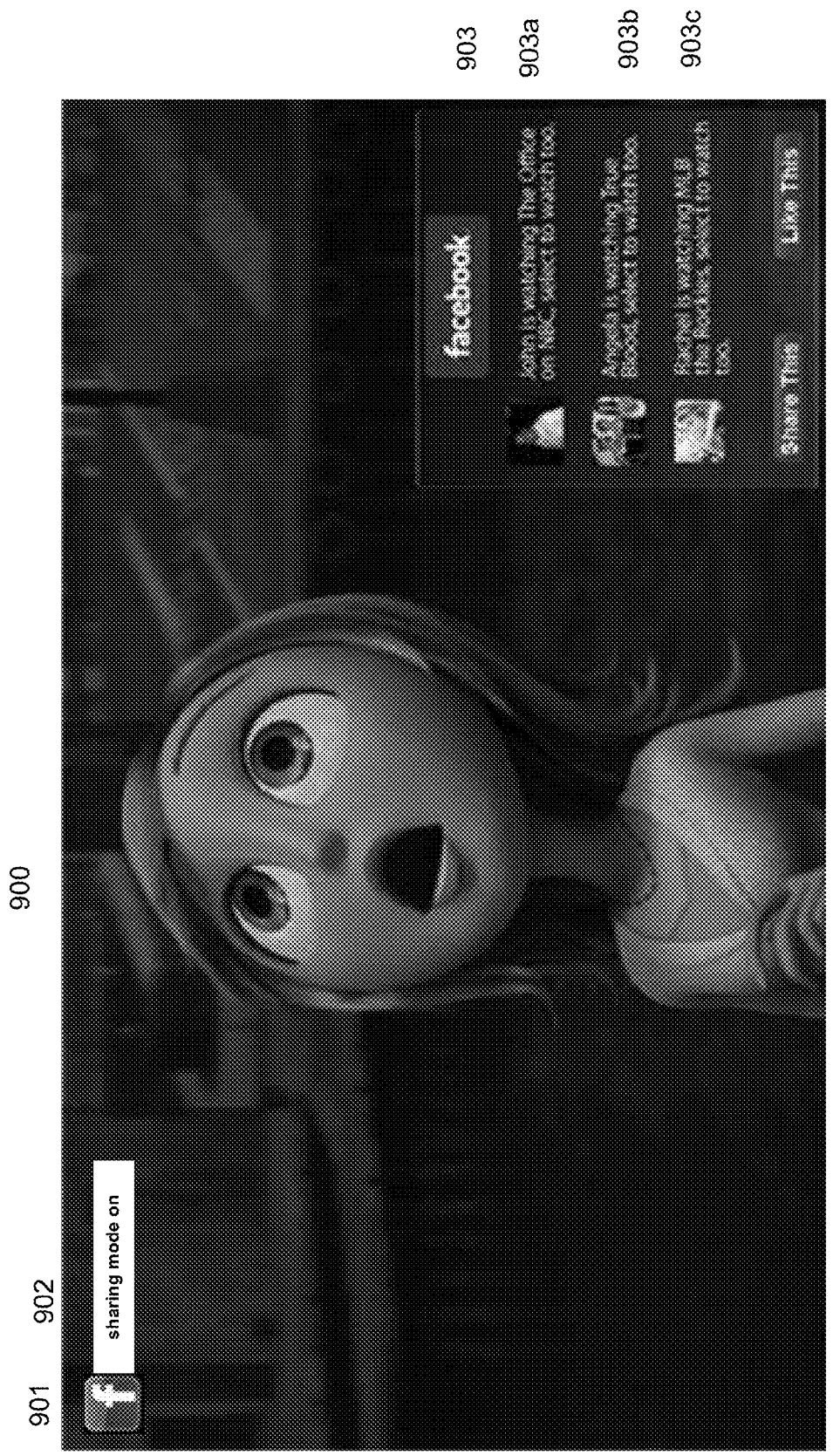
FIG. 8B illustrates an example of a video-playback device displaying content with integrated social data.

FIG. 8A illustrates an example content browser 801 that includes, for didactic purposes, three pieces of content: the film "Avatar" 802, the TV show "The Office" 803, and the TV show "Saturday Night Live" 804. In particular embodiments, when the user logs into a particular external system 122, such as, for example, NetFlix, and is authenticated with his or her social networking user identification and password, NetFlix may choose to display suggested content objects 802-804 that are the most heavily liked or watched by the user's social networking friends. Thus, external system 122 must populate content browser 801 based on social data received from social networking system 100. This requires that external systems 122 be able to interpret the received social data, comprising a social graph content object identifier, actions upon the object, and the user identifiers for the users who performed the actions, so that external system 122 may display the content represented by the content object identifier. For example, it is unrewarding and frustrating for a Netflix user to be presented with a statement that "Bret Taylor and 127 friends watch Avatar" if the link is not selectable, or does not navigate the user to the content page for Avatar on Netflix. In particular embodiments, external systems 122 may implement the same method of content identifier matching described in FIG. 4 in reverse. For example, NetFlix may receive a social graph content object identifier and query the social graph via API server 106 to obtain the title, actor, director, duration, and other object attributes. Netflix may then search among its own proprietary content data (or provided by an external provider such as Rovi) to find the NetFlix content corresponding to the social graph content object identifier. In particular embodiments, a third-party intermediary such as Rovi may perform this content matching. This disclosure contemplates any suitable method of matching social networking content identifiers to the content identifiers of external systems 122.

Each of content objects 802-804 include social data 802*a*, 803*a*, and 804*a*. In particular embodiments, social data includes the number of friends who have "watched", are planning to watch, or are currently watching the content. In particular embodiments, social data 802*a*-804*a* includes profile pictures pulled from social networking system 100 for the friends who have generated sharing stories for the content objects 802-804. In particular embodiments, the profile pictures are arranged by decreasing social coefficient; the friends who are the closest to the user are displayed first. In particular embodiments, social data 802*a*-804*a* includes other explicit social actions, such as whether a user "likes" a particular content object. This disclosure contemplates displaying any suitable social action in social data 802*a*-804*a*.

Content browser 801 also includes an action button 806 that allows the user to perform a particular action on the content object. In particular embodiments, selecting action button 806 may immediately begin the streaming or playback of the associated content object. In particular embodiments, selecting action button 806 may place the content into the user's queue. in particular embodiments, selecting action button 806 may schedule the content for recording on a DVR. This disclosure contemplates any suitable action button 806 and any suitable action that may be performed on a content object.

FIG. 8B illustrates an example view of a display device 900 during content viewing. In particular embodiments, display 900 includes a social networking portion 903. In particular embodiments, social networking portion 903 may be a pop-up menu displayed when a user presses a dedicated social networking button on his or her remote control. In particular embodiments, social networking portion 903 may be a pop-up menu expanded upon selecting a less obtrusive social networking icon. This disclosure contemplates any suitable method of controlling the display of social portion 903.

In particular embodiments, social portion 903 may include real-time sharing stories 903*a*-903*c*. Real-time sharing stories 903*a-c* describe what content the friends of the user are also watching at the moment. Thus, a user may select any one of real-time sharing stories 903*a-c* to switch the display 900 to view the same program that his or her friend is watching. Such information may prompt both on-network interactions such as messages or wall posts, as well as "real" off-network social interactions such as phone calls or face-to-face conversations at a later time. Social portion 903 may also include, as previously described, active or explicit sharing buttons 904 and 905. Selecting button 904 may generate a sharing story for the currently-watched program on social networking system 100.

Active or explicit sharing buttons 904 and 905 require active participation by the user to share what the user is currently watching to social networking system 100 (and therefore, his or her friends on social networking system 100). In particular embodiments, the user's device may passively share what the user is currently watching to social networking system 100 without any explicit action from the user to do so. In particular embodiments, as the user flips through various channels, his or her device will generate sharing stories substantially in real-time to be posted to social networking system 100. In particular embodiments, social networking system may only publish sharing stories when the user has continually watched one program longer than a predetermined amount of time, to prevent channel surfing from flooding other users' newsfeeds. In particular embodiments, a visible "sharing" indicator 901 may be displayed in display 900 to alert the user that he or she is sharing that he or she is watching the current program to social networking system 100. In particular embodiments, sharing indicator 901 may include an explicit warning 902 that states that the user is currently sharing his or her viewing choices to prevent public humiliation. In the example of FIG. 8B, the sharing indicator 902 merely states "sharing mode on." In particular embodiments, the user may toggle sharing mode on and off with a button in a user interface or hardware device for the viewing device. In particular embodiments, the sharing indicators 901 and 902 may obscure less of the display area. For example, in particular embodiments sharing mode may comprise a red border around the picture. In other embodiments, sharing mode may be indicated by flashing an LED on the viewing device. This disclosure contemplates any suitable sharing indicator implemented in hardware or software.

Figure 9A:
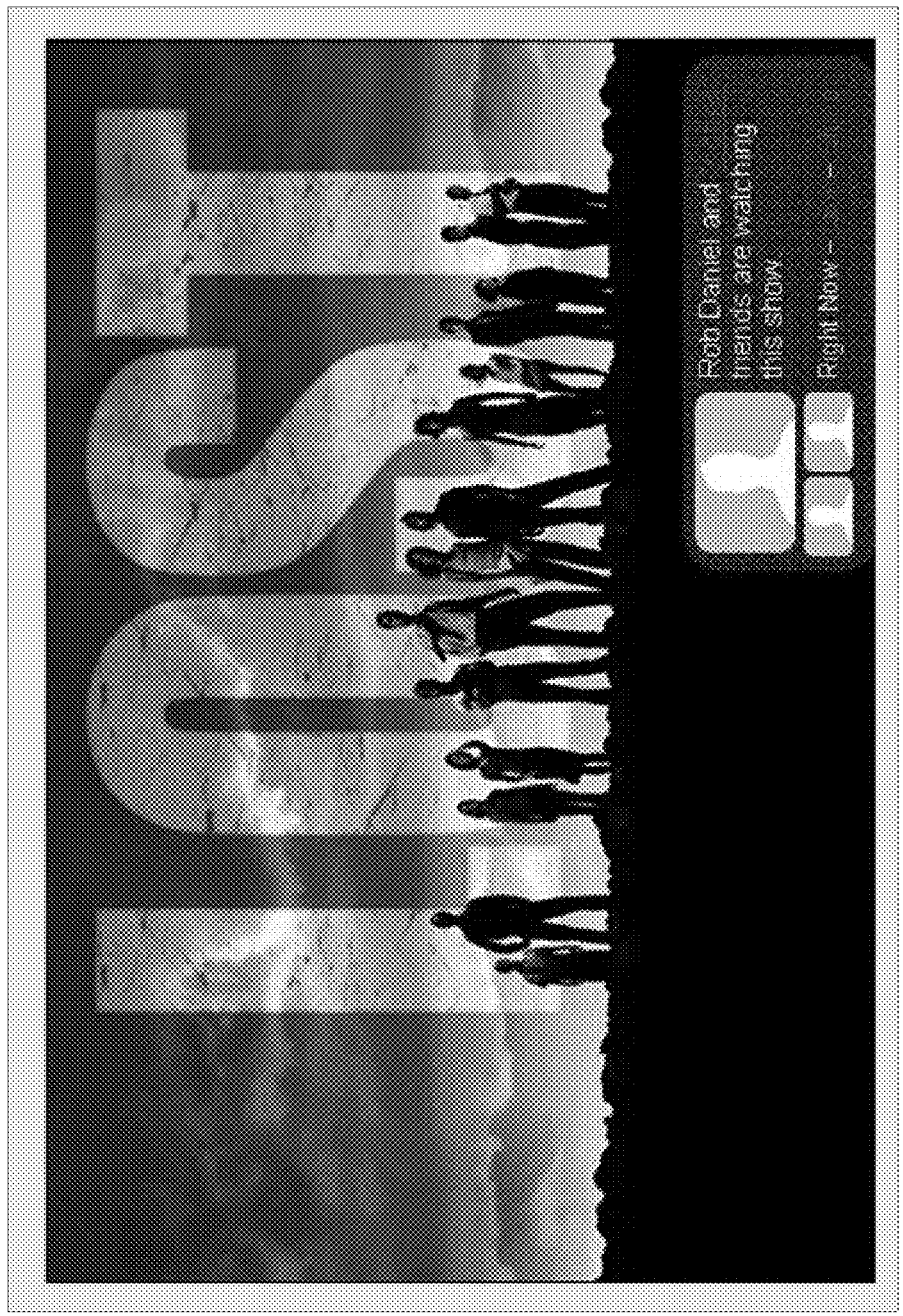
FIG. 9A illustrates an example of a video-playback device displaying substantially real-time social data.

FIG. 9A illustrates another example display when a user watches a particular program augmented with social data. As with FIG. 8B, the display of FIG. 9A includes a social portion 903. In particular embodiments, social portion 903 may display the user's friends who are currently watching the same show. In particular embodiments, the profile pictures of the user's friends are displayed. In particular embodiments, social portion 903 may pop up when a user's friend also starts watching the same show. In particular embodiments, social portion 903 may automatically minimize after a predetermined period of time. In particular embodiments, social portion 903 may pop up every time a new friend begins watching the same program. In particular embodiments, in addition to the "like" and "share" buttons, social portion 903 may include a "chat" option that allows the user to join a substantially real-time chat session with his or her friends watching the same program. Such an embodiment is described in further detail with reference to FIG. 9B.

Figure 9B:
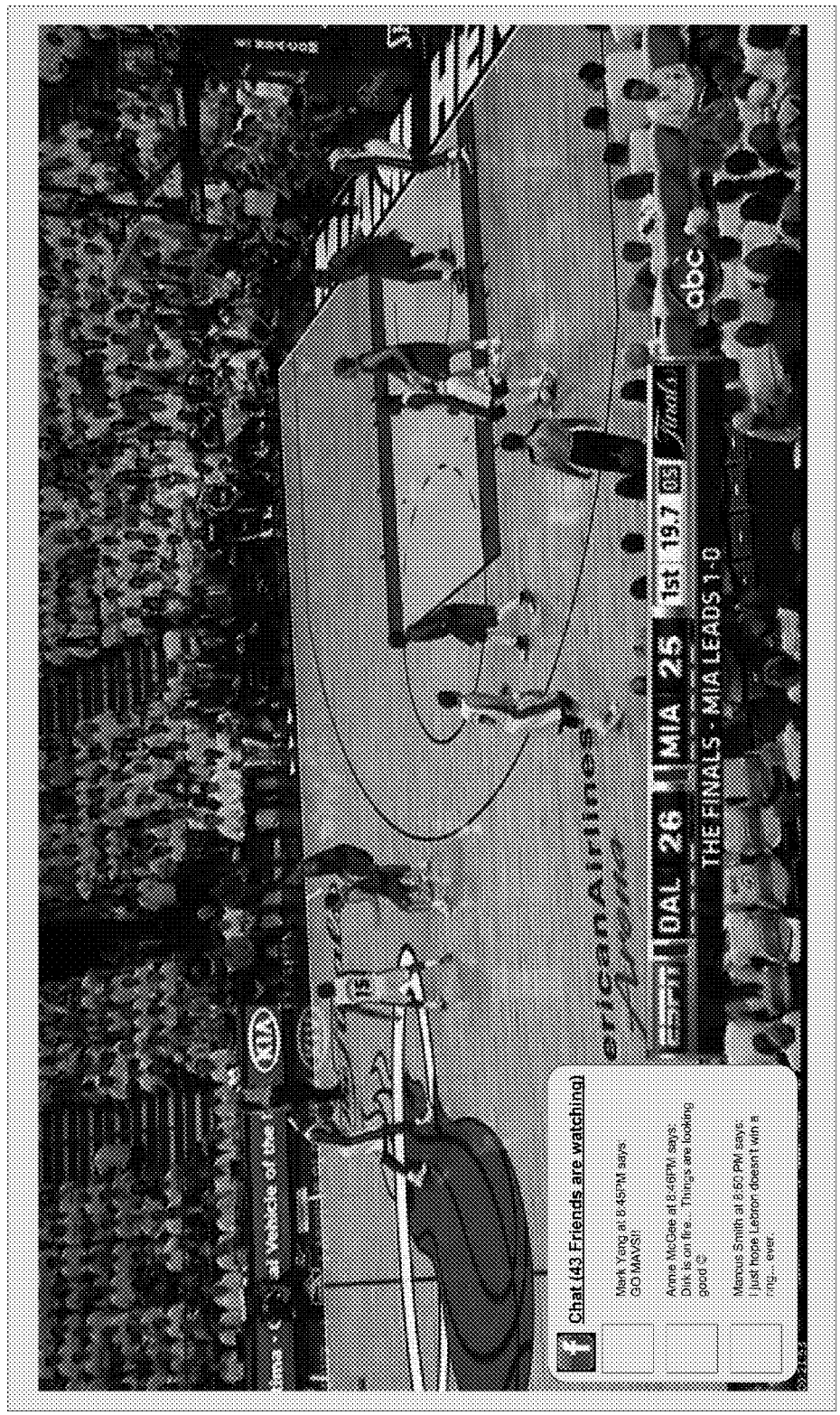
FIG. 9B illustrates an example of a video-playback device displaying content integration substantially in real-time with other members of a social-networking system.

FIG. 9B illustrates an example display where the user is engaged in a group chat with his or her friends who are watching the same program. Chat window 910 may include the number of friends of the user who are also watching the same program. Individual messages 911, 912, and 913 may be posted by friends of the user, or the user interacting with keyboard or other input device. Individual messages 911-913 may include the time of posting as well as a profile picture for the posting user. In particular embodiments, chat window 910 may be displayed on a separate device. For example, if a user is watching a program on his television and joins a group chat, his or her social networking smartphone application may display chat window 910, so the user may enter chats without a dedicated TV input device. This disclosure contemplates any suitable placement or means of interacting with chat window 910.

Figure 10:
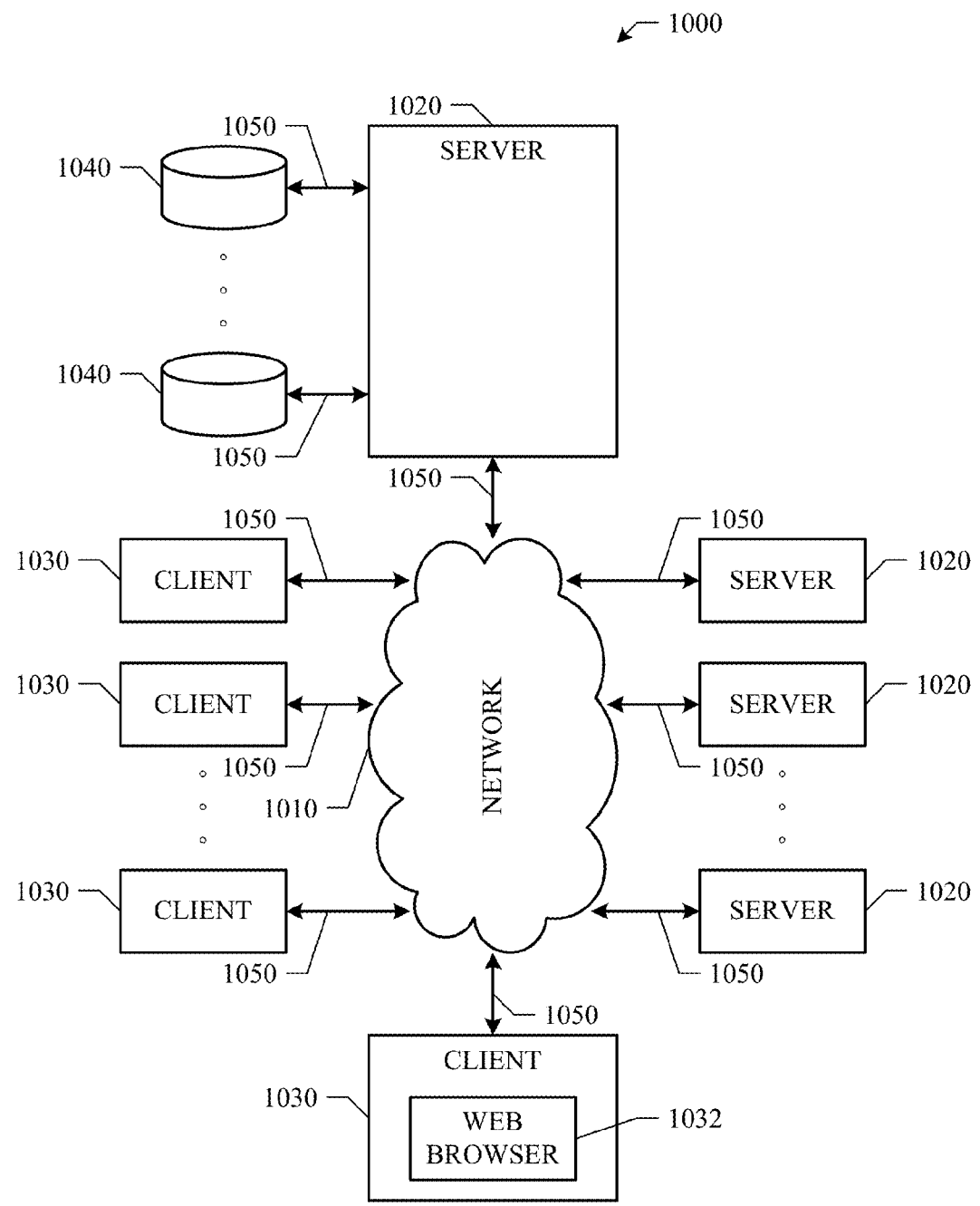
FIG. 10 is an example network environment.

While the foregoing embodiments may be implemented in a variety of network configurations, the following illustrates an example network environment for didactic, and not limiting, purposes. FIG. 10 illustrates an example network environment 1000. Network environment 1000 includes a network 1010 coupling one or more servers 1020 and one or more clients 1030 to each other. Network environment 1000 also includes one or more data storage 1040 linked to one or more servers 1020. Particular embodiments may be implemented in network environment 1000. For example, social networking system frontend 120 may be written in software programs hosted by one or more servers 1020. For example, event database 102 may be stored in one or more storage 1040. In particular embodiments, network 1010 is an intranet, an extranet, a virtual private network (VPN), a local area network (LAN), a wireless LAN (WLAN), a wide area network (WAN), a metropolitan area network (MAN), a portion of the Internet, or another network 1010 or a combination of two or more such networks 1010. This disclosure contemplates any suitable network 1010.

One or more links 1050 couple a server 1020 or a client 1030 to network 1010. In particular embodiments, one or more links 1050 each includes one or more wired, wireless, or optical links 1050. In particular embodiments, one or more links 1050 each includes an intranet, an extranet, a VPN, a LAN, a WLAN, a WAN, a MAN, a portion of the Internet, or another link 1050 or a combination of two or more such links 1050. This disclosure contemplates any suitable links 1050 coupling servers 1020 and clients 1030 to network 1010.

In particular embodiments, each server 1020 may be a unitary server or may be a distributed server spanning multiple computers or multiple datacenters. Servers 1020 may be of various types, such as, for example and without limitation, web server, news server, mail server, message server, advertising server, file server, application server, exchange server, database server, or proxy server. In particular embodiments, each server 1020 may include hardware, software, or embedded logic components or a combination of two or more such components for carrying out the appropriate functionalities implemented or supported by server 1020. For example, a web server is generally capable of hosting websites containing web pages or particular elements of web pages. More specifically, a web server may host HTML files or other file types, or may dynamically create or constitute files upon a request, and communicate them to clients 1030 in response to HTTP or other requests from clients 1030. A mail server is generally capable of providing electronic mail services to various clients 1030. A database server is generally capable of providing an interface for managing data stored in one or more data stores.

In particular embodiments, one or more data storages 1040 may be communicatively linked to one or more servers 1020 via one or more links 1050. In particular embodiments, data storages 1040 may be used to store various types of information. In particular embodiments, the information stored in data storages 1040 may be organized according to specific data structures. In particular embodiment, each data storage 1040 may be a relational database. Particular embodiments may provide interfaces that enable servers 1020 or clients 1030 to manage, e.g., retrieve, modify, add, or delete, the information stored in data storage 1040.

In particular embodiments, each client 1030 may be an electronic device including hardware, software, or embedded logic components or a combination of two or more such components and capable of carrying out the appropriate functions implemented or supported by client 1030. For example and without limitation, a client 1030 may be a desktop computer system, a notebook computer system, a netbook computer system, a handheld electronic device, or a mobile telephone. This disclosure contemplates any suitable clients 1030. A client 1030 may enable a network user at client 1030 to access network 1030. A client 1030 may enable its user to communicate with other users at other clients 1030.

A client 1030 may have a web browser 1032, such as MICROSOFT INTERNET EXPLORER, GOOGLE CHROME or MOZILLA FIREFOX, and may have one or more add-ons, plug-ins, or other extensions, such as TOOL-BAR or YAHOO TOOLBAR. A user at client 1030 may enter a Uniform Resource Locator (URL) or other address directing the web browser 1032 to a server 1020, and the web browser 1032 may generate a Hyper Text Transfer Protocol (HTTP) request and communicate the HTTP request to server 1020. Server 1020 may accept the HTTP request and communicate to client 1030 one or more Hyper Text Markup Language (HTML) files responsive to the HTTP request. Client 1030 may render a web page based on the HTML files from server 1020 for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 11:
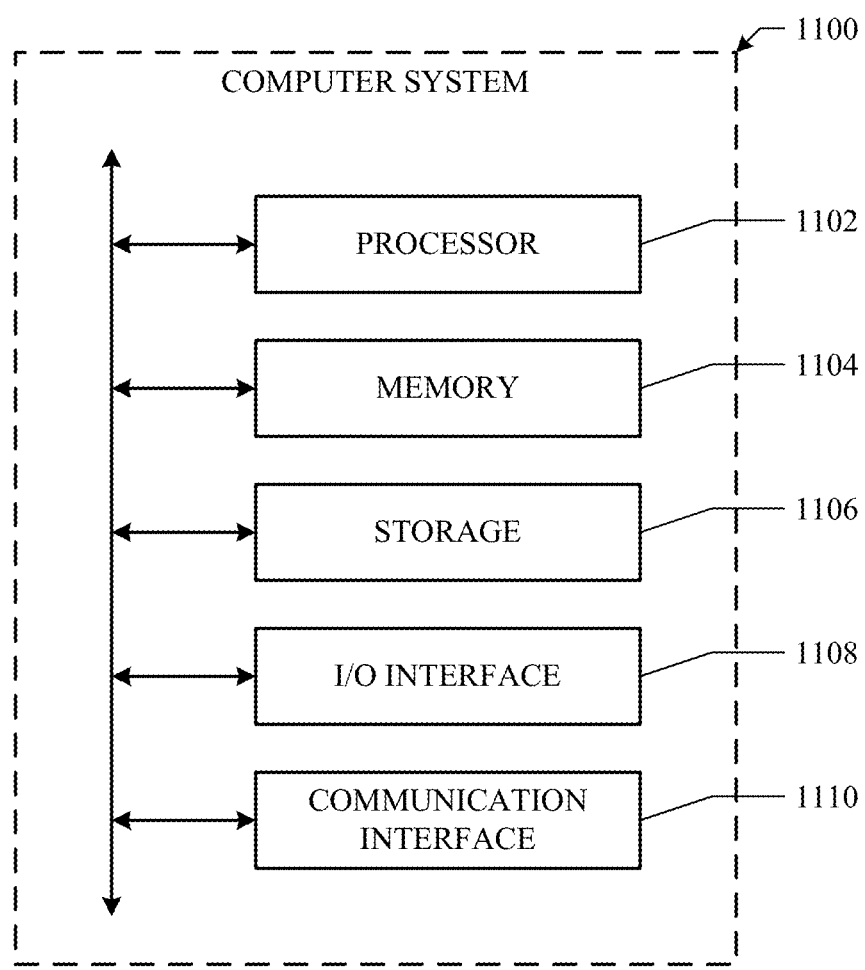
FIG. 11 is an example computing system.

FIG. 11 illustrates an example computing system architecture, which may be used to implement a server. In one embodiment, hardware system 1100 comprises a processor 1102, a cache memory 1104, and one or more executable modules and drivers, stored on a tangible computer readable medium, directed to the functions described herein. Additionally, hardware system 1100 includes a high performance input/output (I/O) bus 1106 and a standard I/O bus 1108. A host bridge 1108 couples processor 1102 to high performance I/O bus 1106, whereas I/O bus bridge 1112 couples the two buses 1106 and 1108 to each other. A system memory 1114 and one or more network/communication interfaces 1116 couple to bus 1106. Hardware system 1100 may further include video memory (not shown) and a display device coupled to the video memory. Mass storage 11111, and I/O ports 1120 couple to bus 1108. Hardware system 1100 may optionally include a keyboard and pointing device, and a display device (not shown) coupled to bus 1108. Collectively, these elements are intended to represent a broad category of computer hardware systems, including but not limited to general purpose computer systems based on the x116-compatible processors manufactured by Intel Corporation of Santa Clara, Calif., and the x116-compatible processors manufactured by Advanced Micro Devices (AMD), Inc., of Sunnyvale, Calif., as well as any other suitable processor.

The elements of hardware system 1100 are described in greater detail below. In particular, network interface 1116 provides communication between hardware system 1100 and any of a wide range of networks, such as an Ethernet (e.g., IEEE 1102.3) network, a backplane, etc. Mass storage 11111 provides permanent storage for the data and programming instructions to perform the above-described functions implemented in the servers 22a, 22b, whereas system memory 1114 (e.g., DRAM) provides temporary storage for the data and programming instructions when executed by processor 1102. I/O ports 620 are one or more serial and/or parallel communication ports that provide communication between additional peripheral devices, which may be coupled to hardware system 1100.

Hardware system 1100 may include a variety of system architectures; and various components of hardware system 1100 may be rearranged. For example, cache 1104 may be on-chip with processor 1102. Alternatively, cache 1104 and processor 1102 may be packed together as a "processor module," with processor 1102 being referred to as the "processor core." Furthermore, certain embodiments may not require nor include all of the above components. For example, the peripheral devices shown coupled to standard I/O bus 1108 may couple to high performance I/O bus 1106. In addition, in some embodiments, only a single bus may exist, with the components of hardware system 1100 being coupled to the single bus. Furthermore, hardware system 1100 may include additional components, such as additional processors, storage devices, or memories.

In one implementation, the operations of the embodiments described herein are implemented as a series of executable modules run by hardware system 1100, individually or collectively in a distributed computing environment. In a particular embodiment, a set of software modules and/or drivers implements a network communications protocol stack, browsing and other computing functions, optimization processes, and the like. The foregoing functional modules may be realized by hardware, executable modules stored on a computer readable medium, or a combination of both. For example, the functional modules may comprise a plurality or series of instructions to be executed by a processor in a hardware system, such as processor 1102. Initially, the series of instructions may be stored on a storage device, such as mass storage 11111. However, the series of instructions can be tangibly stored on any suitable storage medium, such as a diskette, CD-ROM, ROM, EEPROM, etc. Furthermore, the series of instructions need not be stored locally, and could be received from a remote storage device, such as a server on a network, via network/communications interface 1116. The instructions are copied from the storage device, such as mass storage 11111, into memory 1114 and then accessed and executed by processor 1102.

An operating system manages and controls the operation of hardware system 1100, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft (r) Windows(r) operating systems, BSD operating systems, and the like. Of course, other implementations are possible. For example, the nickname generating functions described herein may be implemented in firmware or on an application specific integrated circuit.

Furthermore, the above-described elements and operations can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Herein, reference to a computer-readable non-transitory storage medium may include a semiconductor-based or other integrated circuit (IC) (such as, for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, another suitable computer-readable non-transitory storage medium, or a suitable combination of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. By way of example, while embodiments have been described as operating in connection with a social networking website, the disclosure can be used in connection with any communications facility that supports web applications. Furthermore, in some embodiments the term "web service" and "web-site" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing systems:

receiving at a social-networking system from a video-content-provider system a request comprising a user identifier associated with a user of the social-networking system;

querying a social graph of the social-networking system for stories generated by one or more connections of the user on the social-networking system, the social graph comprising a plurality of nodes and edges connecting the nodes, the nodes comprising user nodes that are each associated with a particular user of the social-networking system, wherein edges between the user nodes identify relationships between the users of the social-networking system;

sending one or more of the stories from the social-networking system for use in connection with a service provided to the user by the video-content provider;

receiving, at the social-networking system from the video-content provider, an indication that the user has selected a user interface element to post a new story on the social-networking system that indicates that the user is currently watching particular content, the user interface element being displayed along with the particular content being watched;

creating, by the social-networking system, a new edge in the social graph between a user node associated with the user and a content node associated with the particular content that the user is currently watching;

receiving, at the social-networking system from the video-content provider, an indication that the user has selected an option to passively share what the user watches in the future without any further explicit action from the user; and automatically posting, by the social-networking system after receiving the indication that the user has selected the option to passively share what the user watches in the future, new stories on the social-networking system as the user watches new content, each new story comprising an indication of the particular new content being watched by the user, wherein the new stories are automatically posted on the social-networking system only if the user has continuously watched the new content longer than a predetermined amount of time.

2. The method of claim 1, wherein the video-content provider comprises a multi-service operator (MSO) and the video content comprises cable programming;
wherein the stories comprise actions corresponding to watching a particular piece of video content; and
transmitting one or more stories comprising transmitting the one or more stories to a set-top box associated with the user of the social networking system for presentation of the stories in an electronic program guide (EPG).

3. The method of claim 1, wherein the stories comprise a connection of the user "liking" a particular content object.

4. The method of claim 1, wherein the stories comprise a connection of the user watching a particular content object.

5. The method of claim 1, wherein the stories comprise a connection of the user queuing a particular content object for future viewing.

6. The method of claim 1, wherein:
the query comprises one or more content identifiers; and
the method further comprises
accessing a content-object database; and
matching each of the one or more of the content identifiers to a content object in the content-object database.

7. The method of claim 6, wherein querying the social graph comprises searching the social graph for stories generated by connections of the user on the social-networking system for the one or more content objects.

8. One or more computer-readable non-transitory storage media in one or more computing systems, the media embodying logic that is operable when executed to:
receive at a social-networking system from a video-content-provider system a request comprising a user identifier associated with a user of the social-networking system;
query a social graph of the social-networking system for stories generated by one or more connections of the user on the social-networking system, the social graph comprising a plurality of nodes and edges connecting the nodes, the nodes comprising user nodes that are each associated with a particular user of the social-networking system, wherein edges between the user nodes identify relationships between the users of the social-networking system;

send one or more of the stories from the social-networking system for use in connection with a service provided to the user by the video-content provider;

receive, at the social-networking system from the video-content provider, an indication that the user has selected a user interface element to post a new story on the social-networking system that indicates that the user is currently watching particular content, the user interface element being displayed along with the particular content being watched;

create a new edge in the social graph between a user node associated with the user and a content node associated with the particular content that the user is currently watching;

receive, at the social-networking system from the video-content provider, an indication that the user has selected an option to passively share what the user watches in the future without any further explicit action from the user; and automatically post, after receiving the indication that the user has selected the option to passively share what the user watches in the future, new stories on the social-networking system as the user watches new content, each new story comprising an indication of the particular new content being watched by the user, wherein the new stories are automatically posted on the social-networking system only if the user has continuously watched the new content longer than a predetermined amount of time.

9. The media of claim 8, wherein the video-content provider comprises a multi-service operator (MSO) and the video content comprises cable programming;
wherein the stories comprise actions corresponding to watching a particular piece of video content; and
transmitting one or more stories comprising transmitting the one or more stories to a set-top box associated with the user of the social networking system for presentation of the stories in an electronic program guide (EPG).

10. The media of claim 8, wherein the stories comprise a connection of the user "liking" a particular content object.

11. The media of claim 8, wherein the stories comprise a connection of the user watching a particular content object.

12. The media of claim 8, wherein the stories comprise a connection of the user queuing a particular content object for future viewing.

13. The media of claim 8, wherein:
the query comprises one or more content identifiers; and
the logic is further operable when executed to:
access a content-object database; and
match each of the one or more of the content identifiers to a content object in the content-object database.

14. The media of claim 8, wherein querying the social graph comprises searching the social graph for stories generated by connections of the user on the social-networking system for the one or more content objects.

15. A system comprising:
one or more processors; and
a memory coupled to the processors comprising instructions executable by the processors, the processors operable when executing the instructions to:
receive at a social-networking system from a video-content-provider system a request comprising a user identifier associated with a user of the social-networking system;
query a social graph of the social-networking system for stories generated by one or more connections of the user on the social-networking system, the social graph comprising a plurality of nodes and edges connecting the nodes, the nodes comprising user nodes that are each associated with a particular user of the social-networking system, wherein edges between the user nodes identify relationships between the users of the social-networking system;

send one or more of the stories from the social-networking system for use in connection with a service provided to the user by the video-content provider;

receive, at the social-networking system from the video-content provider, an indication that the user has selected a user interface element to post a new story on the social-networking system that indicates that the user is currently watching particular content, the user interface element being displayed along with the particular content being watched;

create a new edge in the social graph between a user node associated with the user and a content node associated with the particular content that the user is currently watching;

receive, at the social-networking system from the video-content provider, an indication that the user has selected an option to passively share what the user watches in the future without any further explicit action from the user; and automatically post, after receiving the indication that the user has selected the option to passively share what the user watches in the future, new stories on the social-networking system as the user watches new content, each new story comprising an indication of the particular new content being watched by the user, wherein the new stories are automatically posted on the social-networking system only if the user has continuously watched the new content longer than a predetermined amount of time.

16. The system of claim 15, wherein the video-content provider comprises a multi-service operator (MSO) and the video content comprises cable programming;

wherein the stories comprise actions corresponding to watching a particular piece of video content; and transmitting one or more stories comprising transmitting the one or more stories to a set-top box associated with the user of the social networking system for presentation of the stories in an electronic program guide (EPG).

17. The system of claim 15, wherein the stories comprise one or more of:

a connection of the user "liking" a particular content object;

a connection of the user watching a particular content object; and a connection of the user queuing a particular content object for future viewing.

18. The system of claim 15, wherein:

the query comprises one or more content identifiers; and the logic is further operable when executed to:

access a content-object database; and match each of the one or more of the content identifiers to a content object in the content-object database.

* * * * *